(12) United States Patent
Boelter et al.

(10) Patent No.: US 9,611,966 B2
(45) Date of Patent: Apr. 4, 2017

(54) PIPE RETAINER

(71) Applicant: Prabhat Industries, Duluth, GA (US)

(72) Inventors: Ryan C. Boelter, Atlanta, GA (US);
Claus H. H. Boelter, Cornelia, GA (US); Yogesh H. Dhruv, Lawrenceville, GA (US); Gregory D. Cady, Siloam Springs, AR (US); Warren R. Etches, Springdale, AR (US)

(73) Assignee: Prabhat Industries, Duluth, GA (US)

( * ) Notice: Subject to any disclaimer, the term of this patent is extended or adjusted under 35 U.S.C. 154(b) by 95 days.

(21) Appl. No.: 14/068,696

(22) Filed: Oct. 31, 2013

(65) Prior Publication Data

US 2014/0175793 A1 Jun. 26, 2014

Related U.S. Application Data

(60) Provisional application No. 61/720,527, filed on Oct. 31, 2012, provisional application No. 61/720,522, filed on Oct. 31, 2012.

(51) Int. Cl.
| | | |
|---|---|---|
| F16L 17/00 | (2006.01) | |
| F16L 47/08 | (2006.01) | |
| F16L 37/088 | (2006.01) | |
| F16L 37/092 | (2006.01) | |

(52) U.S. Cl.
CPC ............. *F16L 47/08* (2013.01); *F16L 37/088* (2013.01); *F16L 37/092* (2013.01); *F16L 37/0925* (2013.01)

(58) Field of Classification Search
USPC ......... 285/223, 345, 231, 374, 339, 95, 232, 285/230, 113, 346, 342; 277/605, 607, 277/615
See application file for complete search history.

(56) References Cited

U.S. PATENT DOCUMENTS

| | | | | |
|---|---|---|---|---|
| 1,930,194 | A | | 10/1933 | Dillon |
| 2,032,492 | A | * | 3/1936 | Nathan ........................ 277/615 |
| 2,141,645 | A | * | 12/1938 | Fawick .......................... 464/28 |
| 2,271,777 | A | * | 2/1942 | Nathan ........................ 277/615 |
| 2,396,491 | A | * | 3/1946 | Chamberlain ............... 277/615 |
| 2,615,740 | A | * | 10/1952 | Nathan ........................ 277/605 |
| 2,924,472 | A | * | 2/1960 | Bush ............................ 277/605 |
| 2,996,317 | A | * | 8/1961 | Kibbie et al. ................ 277/607 |
| 3,165,324 | A | * | 1/1965 | Zopfi ........................... 277/615 |
| 3,360,273 | A | * | 12/1967 | Hundt et al. ................. 277/605 |
| 3,554,569 | A | * | 1/1971 | Gorman .............. F16J 15/3236 277/615 |
| 3,719,375 | A | * | 3/1973 | Nordin ................. F16L 19/063 285/339 |
| 3,792,878 | A | * | 2/1974 | Freeman .................... 285/150.1 |
| 3,913,928 | A | * | 10/1975 | Yamaguchi .................. 277/604 |
| 3,938,834 | A | * | 2/1976 | Oostenbrink ................ 285/235 |

(Continued)

*Primary Examiner* — Aaron Dunwoody
(74) *Attorney, Agent, or Firm* — Smith, Gambrell & Russell

(57) ABSTRACT

A joint structure for connecting lengths of pipe uses a plurality of teeth to engage the surface of at least one end of the adjacent lengths of pipe to connect the ends. A deformable member applies forces to the plurality of teeth to engage the surfaces. In an aspect, the plurality of teeth are releasable. In another aspect, the plurality of teeth are permanently engaged into the surfaces.

8 Claims, 21 Drawing Sheets

(56) References Cited

U.S. PATENT DOCUMENTS

| | | | | |
|---|---|---|---|---|
| 4,293,138 A | * | 10/1981 | Swantee | 277/607 |
| 4,466,640 A | | 8/1984 | Van Houtte | |
| 4,662,662 A | * | 5/1987 | Delhaes | 285/379 |
| 5,288,087 A | * | 2/1994 | Bertoldo | 277/616 |
| 5,649,712 A | * | 7/1997 | Ekholm | 277/607 |
| 5,653,452 A | * | 8/1997 | Jarvenkyla | 277/607 |
| 5,687,997 A | * | 11/1997 | Beacom | 285/94 |
| 6,152,494 A | | 11/2000 | Corbett et al. | |
| 6,345,844 B1 | * | 2/2002 | Miyajima et al. | 285/39 |
| 6,457,718 B1 | | 10/2002 | Quesada | |
| 6,499,744 B1 | | 12/2002 | Quesada | |
| 6,945,570 B2 | | 9/2005 | Jones | |
| 6,947,443 B1 | | 9/2005 | Corbett, Jr. | |
| 6,974,160 B2 | | 12/2005 | Jones | |
| D514,671 S | | 2/2006 | Jones | |
| 7,125,054 B2 | | 10/2006 | Jones | |
| 7,134,204 B2 | | 11/2006 | Corbett, Jr. et al. | |
| D553,716 S | | 10/2007 | Lockard | |
| 7,284,310 B2 | | 10/2007 | Jones et al. | |
| D556,866 S | | 12/2007 | Darce | |
| D556,867 S | | 12/2007 | Darce | |
| D557,387 S | | 12/2007 | Darce | |
| D557,771 S | | 12/2007 | Darce | |
| D558,310 S | | 12/2007 | Quesada | |
| 7,310,867 B2 | | 12/2007 | Corbett, Jr. | |
| D559,363 S | | 1/2008 | Darce | |
| 7,328,493 B2 | | 2/2008 | Jones et al. | |
| 7,392,989 B2 | | 7/2008 | Corbett, Jr. | |
| 7,404,872 B2 | | 7/2008 | Fisher | |
| D574,934 S | | 8/2008 | Darce et al. | |
| 7,441,319 B2 | | 10/2008 | Corbett, Jr. et al. | |
| 7,618,071 B2 | | 11/2009 | Jones et al. | |
| 7,677,610 B2 | * | 3/2010 | Schwarz et al. | 285/322 |
| 7,774,915 B2 | | 8/2010 | Darce et al. | |
| 7,802,798 B2 | * | 9/2010 | Beele | 277/607 |
| 7,815,225 B2 | | 10/2010 | Jones et al. | |
| 7,845,686 B2 | | 12/2010 | Steinbruck | |
| 8,074,996 B2 | | 12/2011 | Darce et al. | |
| 8,235,427 B2 | | 8/2012 | Jones et al. | |
| 8,444,186 B2 | | 5/2013 | Jones et al. | |
| 8,833,014 B2 | * | 9/2014 | Beele | 52/220.8 |
| 2004/0130103 A1 | | 7/2004 | Corbett, Jr. | |
| 2004/0232627 A1 | | 11/2004 | Corbett, Jr. | |
| 2004/0232699 A1 | | 11/2004 | Jones | |
| 2004/0232700 A1 | | 11/2004 | Jones | |
| 2004/0234776 A1 | | 11/2004 | Corbett, Jr. | |
| 2005/0040645 A1 | | 2/2005 | Jones | |
| 2005/0046189 A1 | | 3/2005 | Corbett, Jr. et al. | |
| 2005/0230972 A1 | | 10/2005 | Owen et al. | |
| 2006/0071431 A1 | | 4/2006 | Corbett, Jr. | |
| 2006/0082141 A1 | | 4/2006 | Corbett, Jr. | |
| 2006/0119100 A1 | | 6/2006 | Jones et al. | |
| 2006/0181031 A1 | | 8/2006 | Corbett, Jr. et al. | |
| 2006/0279080 A1 | | 12/2006 | Jones et al. | |
| 2007/0063516 A1 | | 3/2007 | Jones et al. | |
| 2007/0200005 A1 | | 8/2007 | Corbett, Jr. et al. | |
| 2007/0267139 A1 | | 11/2007 | Fisher | |
| 2008/0001401 A1 | | 1/2008 | Quesada et al. | |
| 2008/0018017 A1 | | 1/2008 | Quesada et al. | |
| 2008/0157524 A1 | | 7/2008 | Jones et al. | |
| 2008/0277884 A1 | | 11/2008 | Corbett, Jr. et al. | |
| 2008/0284166 A1 | | 11/2008 | Darce et al. | |
| 2008/0303220 A1 | | 12/2008 | Darce et al. | |
| 2009/0060635 A1 | | 3/2009 | Jones et al. | |
| 2009/0152863 A1 | | 6/2009 | Steinbruck | |
| 2009/0200705 A1 | | 8/2009 | Mora | |
| 2009/0273184 A1 | | 11/2009 | Wright et al. | |
| 2010/0059940 A1 | | 3/2010 | Monteil | |
| 2010/0078937 A1 | | 4/2010 | Jones et al. | |
| 2010/0244442 A1 | | 9/2010 | Jones et al. | |
| 2010/0264645 A1 | | 10/2010 | Jones et al. | |
| 2011/0062700 A1 | | 3/2011 | Corbett, Jr. | |
| 2011/0156312 A1 | | 6/2011 | Monteil et al. | |
| 2011/0187059 A1 | | 8/2011 | Chinchilla et al. | |
| 2012/0001414 A1 | * | 1/2012 | Arning et al. | 285/3 |
| 2012/0025471 A1 | * | 2/2012 | Andrick et al. | 277/314 |
| 2012/0267891 A1 | * | 10/2012 | Walz et al. | 285/331 |
| 2015/0076817 A1 | * | 3/2015 | Bizzarrini | 285/374 |

\* cited by examiner

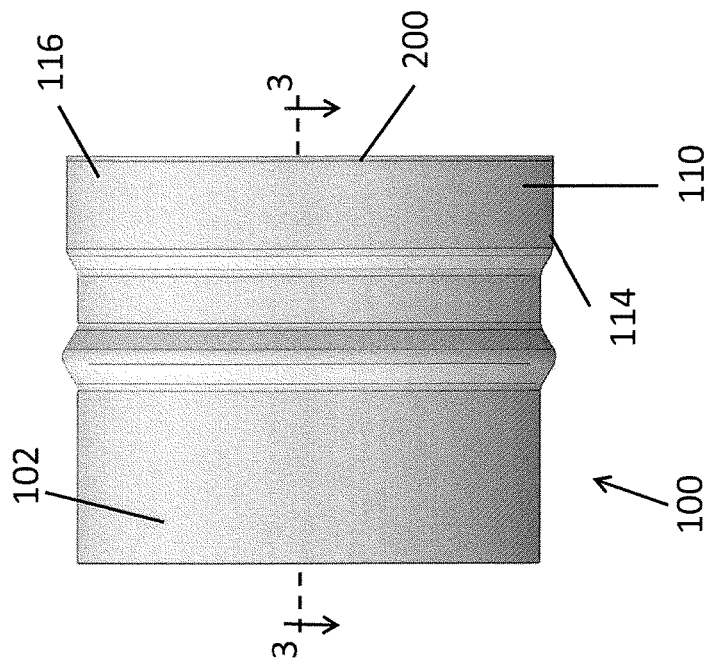
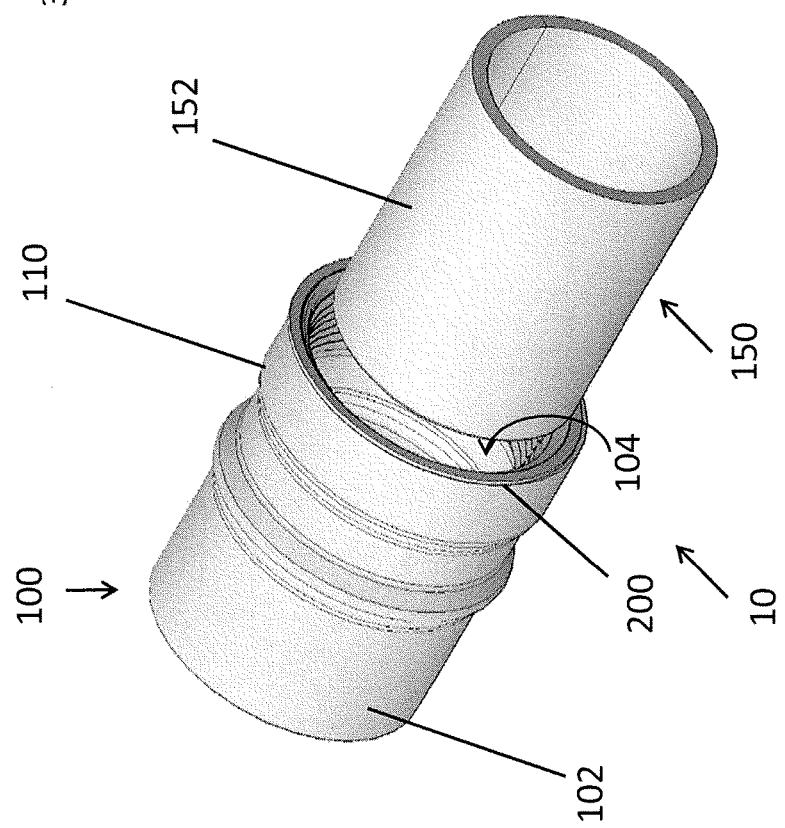

PIPE RETAINER

CLAIM OF PRIORITY

This application claims priority from U.S. Provisional Patent Application No. 61/720,522, filed on Oct. 31, 2012, and 61/720,527, filed on Oct. 31, 2012, which are relied upon and incorporated herein in their entirety by reference.

BACKGROUND OF THE INVENTION

The present invention relates to the field of pipe joining and more particular to retainers for joining lengths of bell and spigot type PVC pipe. Such pipe is used in municipal water distribution systems, fire sprinkler systems, sewerage force mains, agricultural and irrigation systems, industrial process piping application, PVC electrical conduits and fittings, as well as through out the building construction industry and in large diameter water transmission mains. Those knowledgeable in the art understand that the lengths of pipe must be secured against leakage as well as against separation. Prior art in this field is illustrated in U.S. Pat. Nos. 7,537,248; 7,284,310; 4,120,521; 4,061,459 and others.

SUMMARY OF THE PRESENT INVENTION

It is an object of the present invention to securely connect the ends of PVC pipe to prevent separation of individual pipes in a pipeline.

It is a further object of the present invention to connect the ends of PVC pipe to prevent undue stress on the connecting components leading to failure in the pipeline.

In an aspect, the following devices are added to the pipe for "joining-purposes" after the pipe pieces have been belled and finished.

In an aspect, the following devices are configured to connect a spigot end of one pipe to the bell end of another pipe.

These objects are met by lengthening the bell to accommodate one or more retention devices. In an aspect, the bell can be lengthened to for a bell extension. In an aspect, the retention devices comprise a plurality of teeth and a deformable member to secure the spigot end within the bell extension. In an aspect, the deformable member can engage a surface of the spigot end and/or a surface of the bell extension. In an aspect, the deformable member can resiliently urge the plurality of teeth to engage a surface of the spigot end, a surface of the bell extension, or a combination of surfaces.

In an aspect, the retention device can permanently join engage the plurality of teeth into a surface of the spigot end or bell extension. In another aspect, the retention device can releasably engage the plurality of teeth into a surface of the spigot end or the bell extension. In such aspects, means operable from externally of the bell for retracting the teeth from engagement with the outer surface of the spigot end can be utilized.

The following aspects below meet some or all of the objects discussed above.

Deep Channel Insert.

A bell extension is formed so that there is precisely enough room between the outside wall of the spigot and the inside wall of the bell extension to fit the retention device that can be described as a deep channel insert. The deep channel insert is placed on the inside of the end of the bell extension before the spigot is inserted. The deep channel insert is constructed to have a deformable member having deformable qualities or a flexible factor that allows for the spigot to pass by on insertion but prevents the removal of the spigot from the retention device and the bell extension through a plurality of teeth. Once the retention device has been installed, removal of the spigot is not possible without destructive separation.

Two-Piece Toothed Insert.

A bell extension is formed so that there is precisely enough room between the outside wall of the spigot and the inside wall of the bell extension to fit the retention device can be described as a two piece toothed insert. The two piece toothed insert includes two separate bodies that form a deformable member. The two bodies are placed on the inside of the end of the bell extension before the spigot is inserted. The inserts are conformed to have deformable properties and/or a flexible factor that will allow for the spigot to pass by on insertion but prevents the removal of the spigot from the retention device and the bell extension through a plurality of teeth. Once the retention device has been installed, removal of the spigot is not possible without destructive separation.

Claw Ring.

The retention device described as a claw ring can be configured to use the inside and outside of the bell extension to secure the spigot in the constructed joint position. A recess formed in the end of the retention device receives the bell. Once aligned, the spigot insertion will compress the inside teeth of the retention device to pass through without engaging. The deformable member can then resiliently urge the teeth to engage the spigot. An outer ring will be placed around an exterior sleeve and tightened to ensure the grip on the bell extension and the spigot is secure. The sleeve is a redundant mechanism that works by creating a somewhat flexible backbone for the retention device. Once the retention device has been installed, removal of the spigot is not possible without destructive separation.

Wedged Lock Ring Assembly.

The bell has been elongated and the inside of the elongation has been routed to form a channel in which the retention device, which can be described as a wedged lock ring assembly, can be fitted. The wedged lock ring assembly can include a deformable member (which can be described as a ring) that is slightly flexible so that it will compress and fit easily into the bell extension by hand. Once inside the bell channel, the ring will expand and be fitted with a lock insert. This lock insert will serve to keep the ring expanded when it is desired to take the spigot end out. Another function of the lock will be to keep the ring tight around the spigot when the joint is constructed. The ring can resiliently urge a plurality of teeth found on a surface of the assembly into the surface of the spigot. A hole in the exterior of the elongated bell or a linear channel within the elongated bell with external access can be supplied so that interaction with the lock insert can take place. The device that will be inserted in the lock insert will be rotational so that does not have to be removed for the function to be reached.

Annularly Aligned Teeth Assembly.

A retention device, which can be described as annularly aligned teeth assembly, is set in a casing that fits inside of an elongated bell. When the spigot is inserted the first interaction will be for the teeth to move back into the recessed area of the bell. No further mechanism must be tightened or placed in for the locking mechanism to activate. When attempting to retract the spigot the teeth will resiliently engage due to the angle and original conformation of the device. The teeth will force themselves to contract around the spigot towards a singular axis in the middle.

Removal of the spigot will use a release device slightly larger than the outside diameter of the spigot. The release device will be inserted in to the bell in the same fashion as the spigot, forcing the teeth to move back into the recess of the bell. This will disengage the locking mechanism allowing for the spigot to be removed without substantial effort.

Constrictor Insert.

The bell is elongated and thickened to a point that the standards of the pipe would not be affected. The augmented bell would be routed so that the channel is the same in shape as the retention device, which can be described as a constrictor insert, only slightly larger. The embodiment comprises two mirrored pieces centered about the line on the middle of the band. These pieces are free to move in angle rotated about a central annulus. Adjustable bands are used to retract/expand the mirrored pieces into the desired position via struts arrayed around the bands as connections between the adjustable bands and the mirrored pieces. Metal reinforcing pieces, located underneath the adjustable bands are structurally supportive of the conformation that engages both functions. Surrounding all of rubber and hardware will be a metal shell, that is the base of stability and movement for the device.

These and other objects and advantages of the invention will become apparent from the following detailed description of the preferred embodiment of the invention.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

FIG. 1 is perspective view of a bell extension, spigot, and retention device in accordance to one embodiment of the invention.

FIG. 2 is a plane side view of the bell extension of FIG. 1.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Referring to the FIGS. 1-30 for a clearer understanding of the invention, it may be seen that the invention contemplates several embodiments. FIGS. 1-8 depict a first embodiment of a pipe retention device 10 utilizing a deep channel insert 200 for use with a pipe 100 and spigot 150. The pipe 100 and spigot 150 can be comprised of a variety of different materials that are commonly utilized in, but are not limited to, municipal water distribution systems, fire sprinkler systems, sewerage force mains, agricultural and irrigation systems, industrial process piping application, PVC electrical conduits and fittings, as well as throughout the building construction industry and in large diameter water transmission mains. Such materials can include, but are not limited to, PVC, iron, copper, steel, and various other materials familiar to the piping industry.

Figure 3:
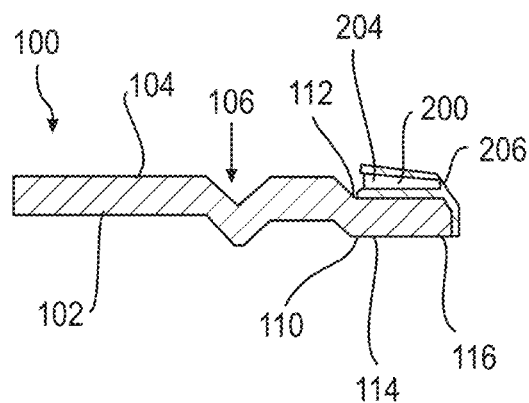
FIG. 3 is a cross sectional view along line 3-3 of the bell extension and retention device of FIG. 1.

As seen in FIGS. 1-3, the pipe 100 terminates in a bell 102 with an inner wall 104. The bell 102, through the inner wall 104, is configured to compress and enclose a conventional gasket (not shown). In an aspect, as shown in FIG. 3, the bell 102 can include an internal annular recess 106 in the inner wall 104 configured to contain the conventional gasket. The combination of the gasket, the pressure of the inner wall 104, and an outer surface 152 of the spigot 150 creates a seal between the bell 102 and the inserted spigot 150.

In an aspect, the bell 102 includes a bell extension 110. The bell extension 110 is configured to provide the necessary length externally of the sealing of the conventional gasket (i.e., past the internal annular recess 106) to provide space for the deep channel insert 200. The bell extension 110 includes an interior surface 112 that is configured to retain and engage with the deep channel insert 200. The bell extension 110 includes a front (distal) end 114 and a back (proximal) end 116. The distal end 114 is adjacent the seal formed by the gasket and spigot 150. The proximal end 116 of the bell extension 110 is opposite the distal end 114.

The bell extension 110 is formed so that there is precisely enough room between the outside wall 152 of the spigot 150 and the interior surface 112 of the bell extension 110 for the deep channel insert 200. In an aspect, the bell extension 110 has a larger diameter than the remainder of the bell 102, not including the annular recess 106, of the pipe 100 in order to retain the deep channel insert 200. In an aspect, the conformation of the bell extension 110 will allow the interior wall 112 to become a rigid anchor point for the deep channel insert 200, discussed in more detail below.

In an aspect, the bell extension 110 is a continuous extension of the bell 102, formed during the initial manufacture of the pipe 100. In another aspect, the bell extension 110 can be coupled to the bell 102 as an add-on part of the pipe 100. However, it is preferable to have the bell extension 110 and bell 102 be formed as an unitary piece in order to avoid the increase potential of the connection of the spigot and bell joint failing when exposed to high amounts of pressure from the liquid(s) passing through the combination, pressure exerted by the pipes themselves, or from other external forces.

As shown in FIGS. 1 and 3-8, the deep channel input 200 is configured to fit within the bell extension 110 to retain the spigot 150 by engaging the interior surface 112 of the bell extension 110. In an aspect, the deep channel insert 200 comprises a deformable member 202, which can be described as a single body 202. The single body 202 is configured to be semi-flexible and to have a flexible factor that assists with the insertion and retention of the spigot 150. For example, the flexible factor of the body 202 allows the spigot 150 to pass through on insertion but not be able to exit the deep channel insert 200 when pulled in an opposite direction (i.e., when fluids apply opposing force or attempts to disconnect the two are made). If the retention device/deep channel insert 200 has no flexibility, but is completely rigid, the spigot 150 would not be able to pass through. By being deformable/semi-flexible, the retention device/deep channel insert 200 can be compressed by the spigot 150 and attempt to return to the original shape once the spigot 150 has been inserted. The body 202 of the deep channel insert 200 can be comprised of a number of different materials, including, but not limited to, hard plastics, polyethylene, high density polyethylene, metal composites and the like. While various materials can be used, it is preferred that the body 202 be made of a material that is more durable and stronger than that of the bell extension 110 and spigot 150 because the retention device 200 has to withstand the forces exerted on or by the pipe 100 and spigot 150 combination.

As shown in FIGS. 3-8, the body 202 of the deep channel insert 200 includes a front (distal) end 204 and a back (proximal) end 206. The distal end 204 is configured to be inserted into the bell extension 110 and rest adjacent to the bell 102 when the deep channel insert 200 is fully inserted. The proximal end 206 is configured to be adjacent the proximal end 116 of the bell extension 110 when the deep channel insert 200 is fully inserted. In an aspect, the proximal end 206 of the body 202 includes a base ring 208. While the overall body 202 of the deep channel insert 200 comprises a circumferential semi-flexible factor, the base ring 208 is preferably rigid. In an aspect, the base ring 208 can be comprised of a more rigid material than other components of the body 202 of the deep channel insert 200. It is preferred that whatever material the base ring 202 is comprised from is stronger and more durable than the material from which the bell extension 110 and spigot 150 are made. The interior portion of the base ring 208 can include an angular surface 208a that assists the insertion of the spigot 150 into the deep channel insert 200. The base ring 208 can include a flange 209. The flange 209 can be configured to engage the proximal end 116 of the bell extension 110 when the deep channel insert 200 is fully inserted. In addition, the flange 209 can be configured to prevent the deep channel insert 200 from being inserted too far within the bell extension 110.

In an aspect, the length of the body 202 from the distal end 204 to the proximal end 206 provides the needed flexibility for insertion of the deep channel insert 200 into the bell extension 110 and insertion of the spigot 150 into the deep channel insert 200. For example, by providing a body 202 with a greater length from the proximal end 206 to the distal end 204, the body 202 can have more flexibility in an annular direction than a body 202 with a shorter length. In another aspect, the body 202 is of a length that is sufficient to prevent the separation of the deep channel insert 200 from the spigot 150 and the bell extension 110. While the length of the body 202 of the deep channel insert 200 can be smaller than the length of the bell extension 110, it is preferable that the length of the body 202 is approximately equal to the length of the bell extension 110 from the distal end 114 to the proximal end 116 in order to have the most possible contact between the outer surface of the deep channel insert 200 and the interior surface 112 of the bell extension 110. In an aspect, the length of the retention device 200 will be limited by the length of the bell extension 110.

Referring to FIGS. 3-8, the body 202 may include an elastomeric core 210. The elastomeric core 210 is configured to behave as a spring/suspension system to keep the spigot 150 within the deep channel insert 200 and the deep channel insert 200 within the bell extension 110, discussed in more detail below. The elastomeric core 210 can be comprised of a variety of elastomeric materials, including, but not limited to, rubbers, elastomers, and the like. The elastomeric core 210 runs from the proximal end 206 to the distal end 204 of the body 202 of the deep channel insert 200. In an aspect, the elastomeric core 210 can be encapsulated by the base ring 208 of the proximal end 206 and left exposed at the distal end 204. In such an aspect, the width of the elastomeric core 210 can be wider at the distal end 204 than at the proximal end 206, assisting in the suspension/spring qualities discussed above and in more detail below.

As shown in FIGS. 3-8, the elastomeric core 210 is substantially surrounded by an outer surface 220 and an inner surface 230 of the body 202. The outer surface 220 of the body 202 is configured to engage the interior surface 112 of the bell extension 110 and the inner surface 230 is configured to engage the outer surface 152 of the spigot 150. The inner surface 230 of the body 202 forms an insert opening 232 configured to receive the spigot 150. In an aspect, the outer surface 220 of the body 202 includes outer teeth 224. The outer teeth 224 are biased in the proximal direction, pointing toward the back end 206 of the body 202. In an aspect, the inner surface 230 of the body 202 includes inner teeth 234. The inner teeth 234 are biased in the distal direction, pointing towards the front end 204 of the body 202. The outer teeth 224 and inner teeth 234 are configured to engage respectively the interior surface 112 of the bell extension 110 and the outer surface 152 of the spigot 150, preventing the spigot 150 from disengaging from the bell extension 110.

In an aspect, the outer and inner teeth 224, 234 of both surfaces 220, 230 of the deep channel insert 200 are configured to be of a material that is capable of embedding the outer and inner teeth 224, 234 within the interior surface 112 of the bell extension 110 and the outer surface 152 of the spigot 150, respectively. Accordingly, in another aspect, the teeth 224, 234 can be formed from a material that is harder than the other components of the body 202 in order to provide teeth 224, 234 capable of engaging the interior surface 112 of the bell extension 110 and the outer surface 152 of the spigot 150 respectively while maintaining the flexibility of the body/deformable member 202 of the deep channel insert 200.

In an aspect, the outer and inner teeth 224, 234 are of a sufficient length to fully engage themselves with the interior surface 112 of the bell extension 110 and the outer surface of the spigot respectively by embedding into such surfaces at such a depth as not to shave the surfaces but to cut into the material of which the surfaces are comprised. In an exemplary example, the teeth outer and inner 224, 234 can be approximately ⅛ inches in height. However, factors such as the sharpness of the outer and inner teeth 224, 234, as well as the amount of force needed to embed the outer and inner teeth 224, 234 into the respective corresponding surfaces 112, 152 of the extension 110 and spigot 150, influence the height of the teeth.

In a further aspect, the outer and inner teeth 224, 234 can be oriented at an angle from the respective surfaces 220, 230 of the body 202 to form a crevice 226, 236 that can retain/accumulate the material of the interior surface 112 of the bell extension 110 and the outer surface 152 of the spigot 150 as the teeth 224, 234 are embedded, as shown in FIG. 3. In an aspect, the crevices 226, 236 can form an appropriate angle from the leading surface of the teeth 224, 234 to the outer surface 220 and inner surface 230 of the deep channel insert 200 respectively. In an additional aspect, the teeth 224, 234 are of a thickness that prevents the teeth 224, 234 from breaking away from their respective base surfaces 220, 230. The thickness of the teeth 224, 234 is dependent on the hardness of the material from which the teeth are made in order to handle the forces exerted upon the joint formed by the pipes 100 and spigot 150.

In an exemplary example, the teeth 224, 234 of both surfaces 220, 230 are comprised of multiple rows of substantially annular teeth 224, 234 oriented in the opposite directions from one another as discussed above. In such exemplary embodiments, space is needed between each row of outer and inner teeth 224, 234 to allow for the affected portion of the material engaged by the outer and inner teeth 224, 234 (i.e., the outer surface 152 of the spigot 150 or the interior surface 112 of the bell extension 110) to move out of the way and be replaced by the respective teeth 224, 234. (i.e., the spaces between the rows of teeth 224, 234 are large enough to allow for volumetric displacement caused by the teeth 224, 234 embedding into the surfaces 112, 152). In other embodiments, the teeth 224, 234 can be of any known types of teeth or prongs configured to engage another surface.

In an aspect, the number of rows of the teeth 224, 234 and the separation distance between each row can be calculated to engage the appropriate amount of the pipe material. In an exemplary aspect, the deep channel insert 200 can include six rows of teeth 224, 234 even spaced apart. In other embodiments, the number of rows of teeth 224, 234 can vary, as well as the distance between each row. The number of teeth 224, 234 cannot exceed a certain amount over a specified distance; if the proximity of teeth 224, 234 is too close, the teeth 224, 234 cannot embed the bell extension 110 and spigot 150. Space is needed between each row of teeth for the affected portion of material to move out of the way and be replaced by the teeth 224, 234, as discussed above.

Figure 8:
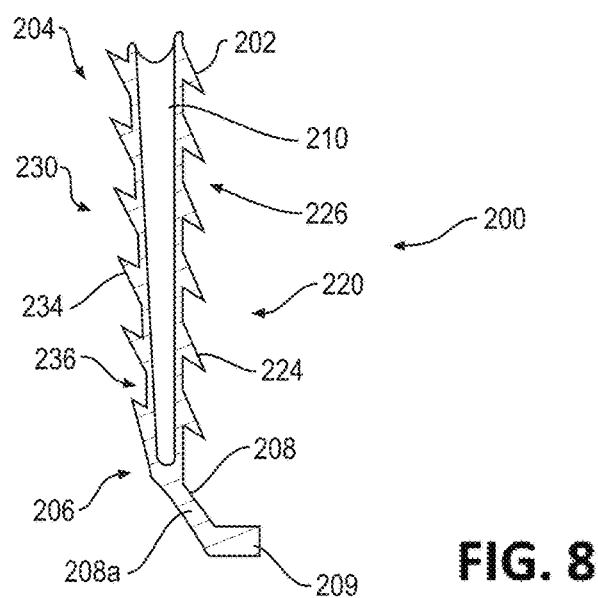
FIG. 8 is a cross sectional view of the retention device along line 8-8 of FIG. 6.

Referring to FIG. 8, the outer surface 220 and the inner surface 230 of the retention device/deep channel insert 200 can be configured to form an angle between each other, originating at the proximal end 206 of the body 202. In other words, the outer surface 220 of the body 202 can be configured to remain oriented in a parallel fashion with the interior surface 112 of the bell extension 110 upon insertion, whereas the inner surface 230 of the body 202 can slant inwards from the proximal end 206 to the distal end 204. In such an aspect, the elastomeric core 210 can have a larger width at the proximal end 206 than at the distal end 202 when the inner surface 230 is not engaged with the spigot.

The combination of the slant of the inner surface 230 and the increasing width of the elastomeric core 210 work in combination to allow the spigot 150 to enter into the opening 232 and retain the spigot 150 within the deep channel insert 200 once the spigot 150 has been inserted completely. As the spigot 150 is inserted further into the deep channel insert 200, the outer surface 152 pushes outwardly on the inner teeth 234 of the inner surface 230, compressing the elastomeric core 210. With the inner teeth 234 being oriented towards the distal end 204, the inner teeth 234 slide along the outer surface 152 of the spigot 150 without embedment occurring. As the elastomeric core 210 is compressed further, the spigot 150 can travel further into the deep channel insert 200, with the spigot 150 not being harmed by the teeth 234. Once the spigot 150 is in its final position within the deep channel insert 200, the combination of the elastomeric core 210 pushing the inner surface 230, including the teeth 234, and the direction of the teeth 234, which will embed into the outer surface 152 of the spigot 150, keep the spigot 150 from exiting the deep channel insert 200. Further, the direction of the outer teeth 224, and the force exerted by the outer surface 220 of the body 202 will embed the outer teeth 224 into the interior surface 112 of the bell extension 110, keeping the deep channel insert 200 and the spigot 150 within the bell extension 110. The elastomeric core 210 will keep the inner teeth 234 pressed against and embedded within the outer surface 152 of the spigot 150 so that when reverse force is applied the teeth 234 will easily engage in their final position.

Figure 4:
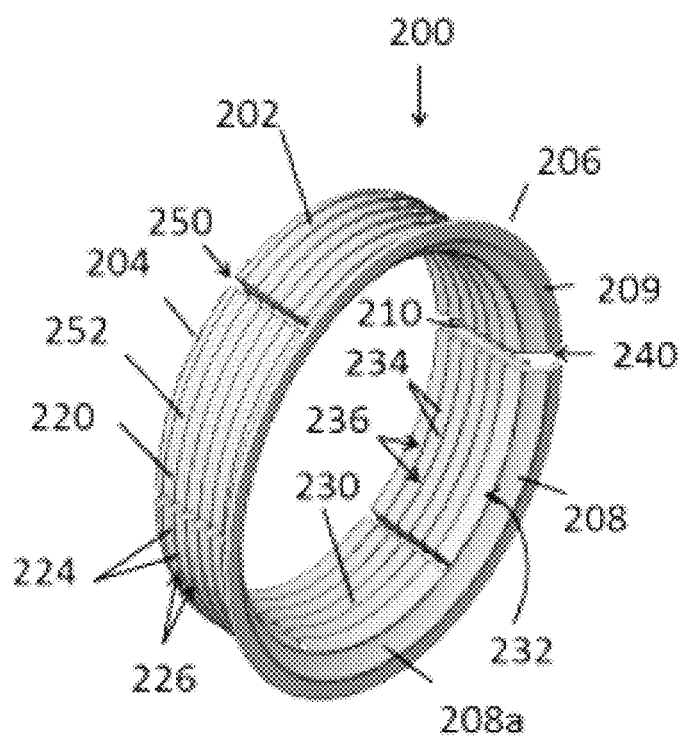
FIG. 4 is a perspective view of the retention device of FIG. 1.
Figure 5:
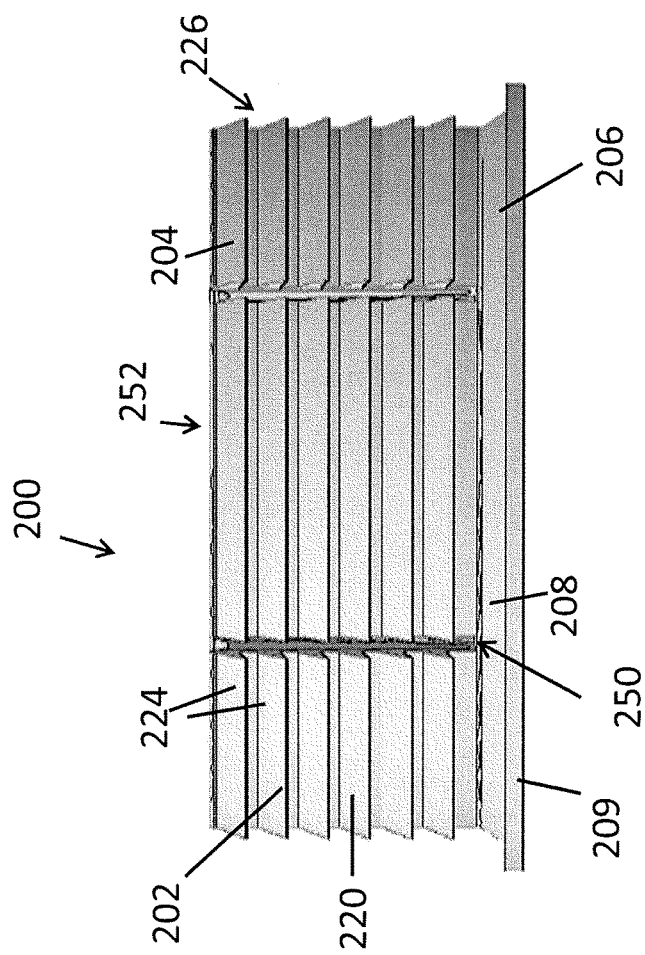
FIG. 5 is a plane side view of the retention device of FIG. 4.
Figure 6:
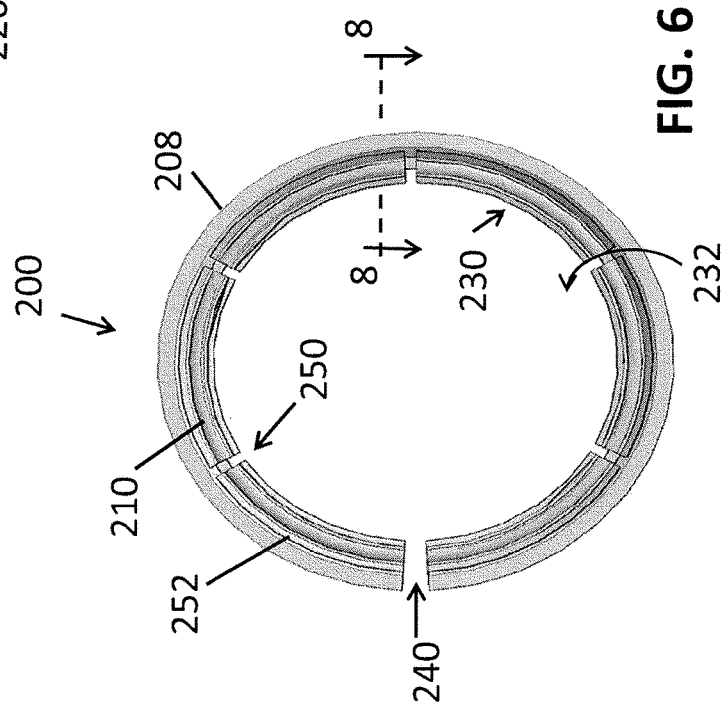
FIG. 6 is a plane top view of the retention device of FIG. 4.
Figure 7:
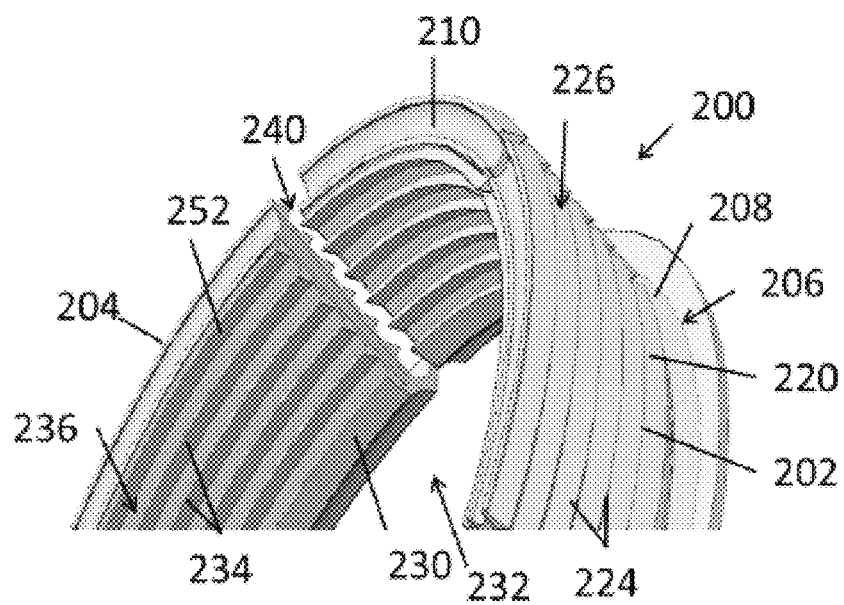
FIG. 7 is a partial perspective view of the retention device of FIG. 4.

Referring to FIGS. 4 and 7, the body 202 of the deep channel insert 200 includes a slot 240 that runs from the distal end 204 to the proximal end 206, and continues through the base ring 208, including the flange 209. The slot 240 provides flexibility for the body 202. In an aspect, the body 202 is approximately 350 degrees, with the slot 240 taking up the remaining 10 degrees. In an exemplary aspect, the elastomeric core 210 can extend partially into the slot 240 or fill the slot completely.

As shown in FIGS. 4-7, the body 202 of the deep channel insert 200 can include a plurality of slits 250. The slits 250 run from the distal end 204 to the proximal end 206 but terminating before reaching the base ring 208. The slits 250 define separate sections 252 of the body 202. The sections 252 are configured to move independently of each other. The sections 252 serve to enhance the gripping ability and increase redundancy so that if one section 252 is not engaged completely and/or properly, the other adjacent sections 252 are not affected. Such an action can occur when the pipes (bell extension 110 or spigot 150) are imperfect or imperfect installation caused by foreign particles in the pipe, improper installation, misalignment, or other like events. In addition, the sections 252 further increase the flexibility of the body 202 to keep the spigot 150 from incurring damage on insertion. This non-restriction allows for each section 252 to move inward further than if the deformable member/body 202 was one solid ring. In an aspect, once the spigot 150 has been fully inserted, the joint formed is not releasable and permanent in nature. In such aspects, in order to release the spigot 150 from the retention device/deep channel insert 200, damage will have to occur to some or all of the components (i.e., the bell extension 110, the spigot 150, and/or the deep channel insert 200).

Figure 9:
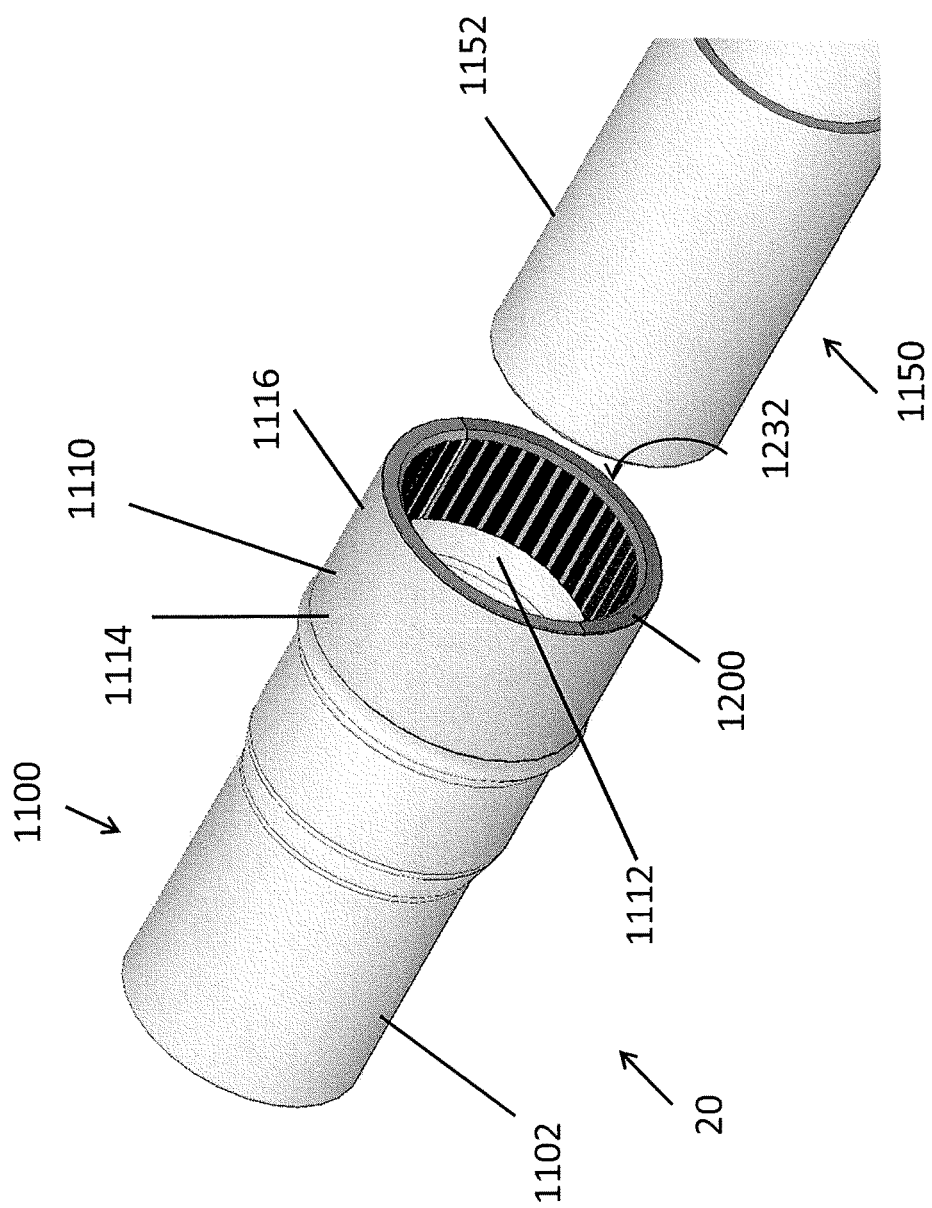
FIG. 9 is a perspective view of a bell extension, spigot, and retention device according to an embodiment of the present invention.
Figure 10:
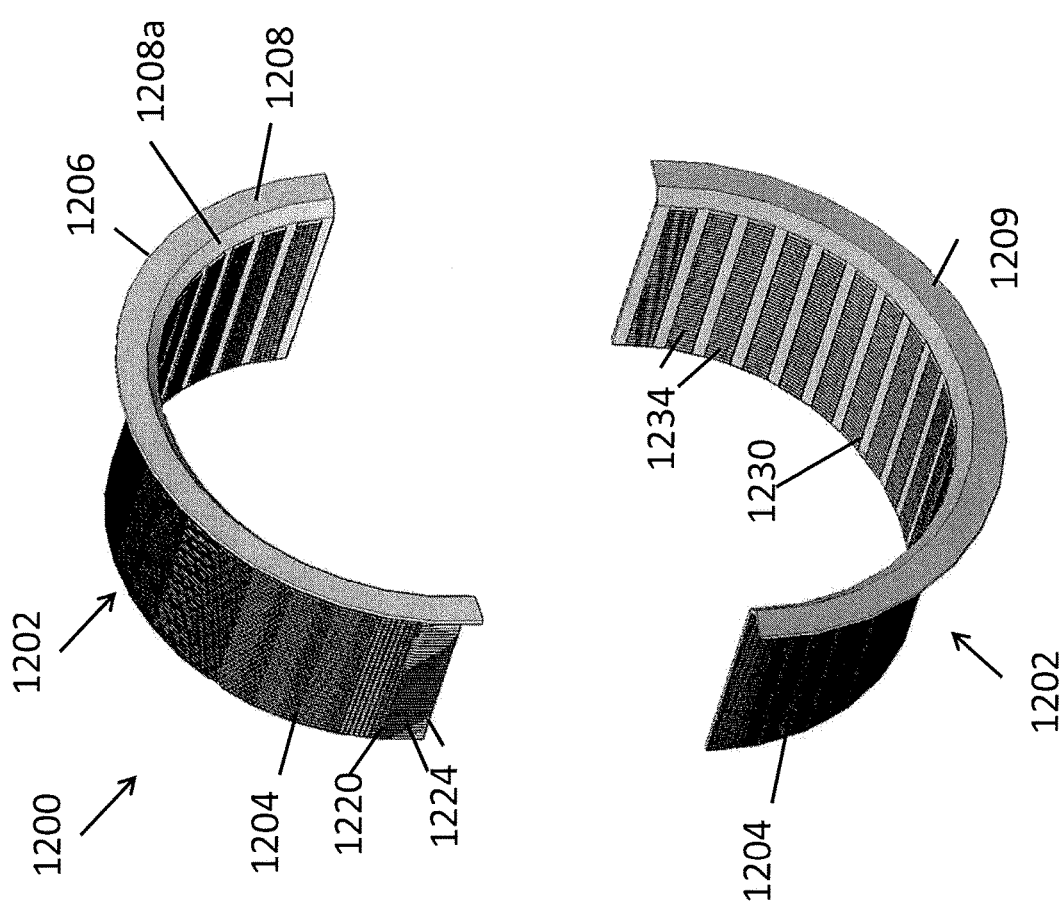
FIG. 10 is a perspective view of the retention device of FIG. 9.
Figure 11:
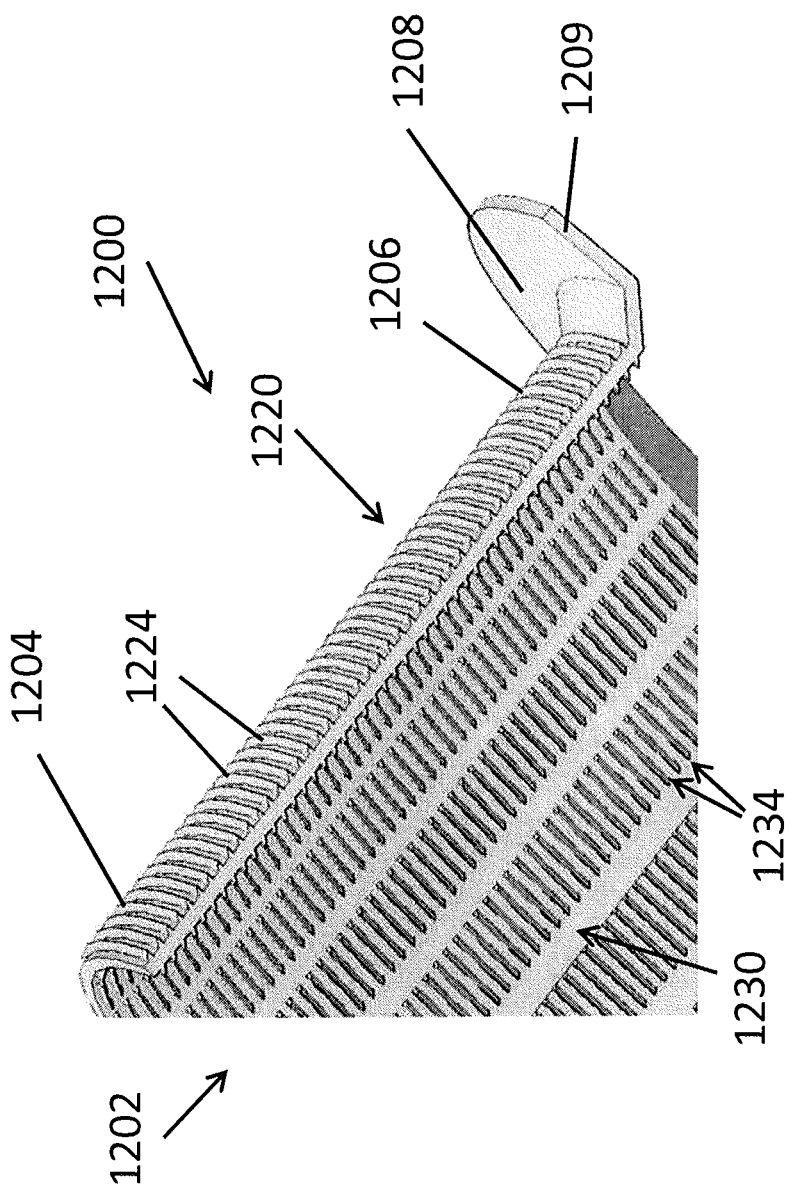
FIG. 11 is a partial close up view of component of the retention device of FIG. 9.
Figure 12:
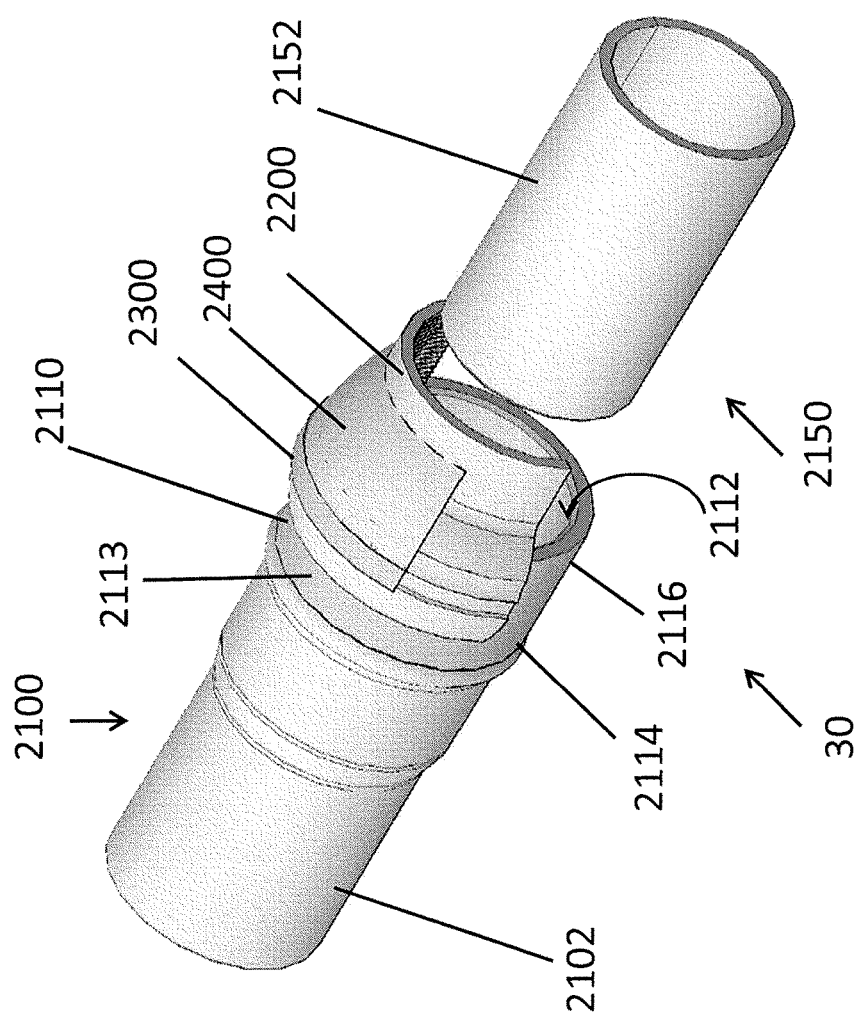
FIG. 12 is a perspective exploded view of a joint formed by a bell extension, spigot, and retention device according to an embodiment of the present invention.
Figures 13, 14:
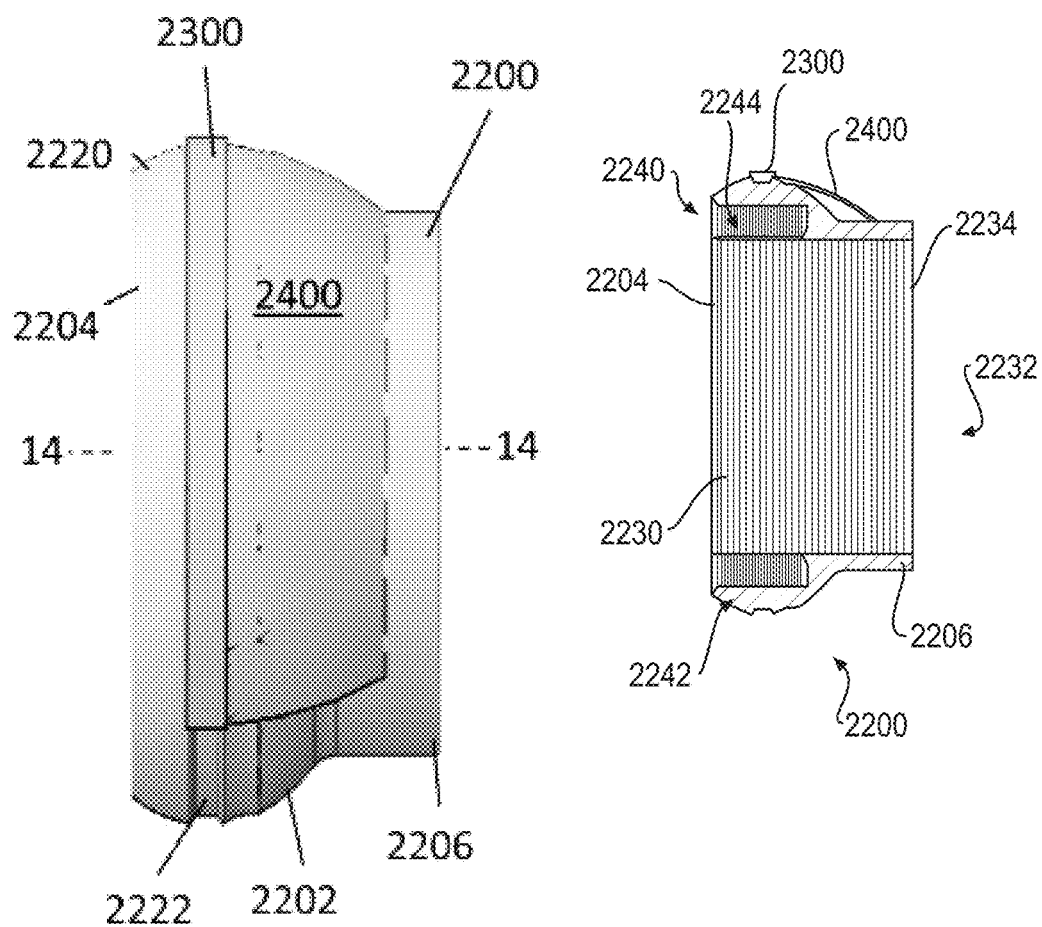
FIG. 13 is a plane side view of the retention device of FIG. 12.
FIG. 14 is a cross-sectional view of the retention device of FIG. 13 along line 14-14.

FIGS. 9-11 illustrate a second embodiment of a pipe retention device 20 that utilizes a two-piece toothed insert 1200 to connect a pipe 1100 to a spigot 1150. The pipe 1100 and spigot 1150 can be comprised of similar materials as to the pipe 100 and spigot 150 associated with the deep channel insert 200 as described above. As seen in FIG. 9, the pipe 1100 can include many of the components of the pipe 100 associated with the deep channel insert 200, including, a bell 1102 with an inner wall with an internal annular recess configured to contain a conventional gasket. In an aspect, the bell 1102 includes a bell extension 1110. The bell extension 1110 is configured to provide the necessary length externally of the sealing of the conventional gasket (i.e., past the internal annular recess 1104) to provide space for the two-piece toothed insert 1200. The bell extension 1110 includes an interior surface 1112 that is configured to retain and two-piece toothed insert. The bell extension 1110 includes a front (distal) end 1114 and a back (proximal) end 1116. The distal end 1114 is adjacent the seal formed by the gasket and spigot 1150. The proximal end 1116 of the bell extension 1110 is opposite the distal end 1114. The bell extension 1110 can be a continuous extension of the bell 1102 formed during the initial manufacture of the pipe 1100 or can be coupled to the bell 1102 as an add-on part of the pipe 1100.

In an aspect, the bell extension 1110 can be formed so that there is precisely enough room between the outside wall/surface 1152 of the spigot 1150 and the interior surface 1112 of the bell extension 1110 for the two-piece toothed insert 1200. In an aspect, the bell extension 1110 can have a larger diameter than the remaining portion bell 1102 of the pipe 1100 in order to retain the two-piece toothed insert 1200. In an aspect, the conformation of the bell extension 1110 will allow the interior wall 1112 to become a rigid anchor point for the two-piece toothed insert 1200, discussed in more detail below.

As shown in FIGS. 9-11, the two-piece toothed insert 1200 is configured to fit within the bell extension 1110 to retain the spigot 1150 by engaging the interior surface 1112 of the bell extension 1110. In an aspect, the two-piece toothed insert 1200 is formed from two separate deformable members/single body pieces 1202. In an aspect, the separate single body pieces 1202 are in the form of semi-circles of equal size (i.e., same radius from a central point and 180 degrees). However, in other embodiments, the separate single body pieces 1202 can have difference ranges of degrees and number of single body pieces 1202.

In an aspect, each body piece 1202 is configured to have a flexible factor that, when inserted into the bell extension 1110 together as one to form the retention device/two-piece toothed insert 1200, will allow the spigot 1150 to pass through on insertion but not be able to exit the two-piece toothed insert 1200 when pulled in an opposite direction (i.e., when fluids apply opposing force or attempts to disconnect the two are made). The separate bodies 1202 of two-piece toothed insert 1200 can be comprised of materials similar to those described in relation to the deep channel insert 200 as discussed above.

As shown in FIG. 10, the deformable members/bodies 1202 include a front (distal) end 1204 and a back (proximal) end 1206. The distal ends 1204 are configured to be inserted into the bell extension 1110 and rest adjacent to the bell 1102 when the two-piece toothed insert 1200 (both bodies 1202) is fully inserted. The proximal ends 1206 are configured to be adjacent the proximal end 1116 of the bell extension 1110 when the two-piece toothed insert 1200 is fully inserted. In an aspect, the proximal ends 1206 of the bodies 1202 include a semi-base ring 1208. While each single body 1202 comprises a circumferential flexible factor, the semi-base ring 1208 is preferably rigid. In an aspect, the semi-base ring 1208 can be comprised of a more rigid material than other components of the single body 1202. The interior portion of the semi-base ring 1208 can include an angular surface 1208a that assists the insertion of the spigot 1150 into the two-piece toothed insert 1200. The semi-base ring 1208 can include a flange 1209. The flanges 1209 can be configured to engage the proximal end 1116 of the bell extension 1110 when the two-piece toothed insert 1200 is fully inserted. In addition, the flanges 1209 can be configured to prevent the two-piece toothed insert 1200 from being inserted too far within the bell extension 1110.

In an aspect, the lengths of the single bodies 1202 from the distal end 1204 to the proximal end 1206 are sufficient to prevent the separation of the two-piece toothed insert 1200 from the spigot 1150 and the bell extension 1110. While the length of the single bodies 1202 can be smaller than the length of the bell extension 1110, it is preferable the length of the bodies 1202 is approximately equal to the length of the bell extension 1110 in order to have the most possible contact between the outer surface of the two-piece toothed insert 1200 and the interior surface 1112 of the bell extension.

In an aspect, the bodies 1202 can be comprised of an elastomeric material, configuring the two-piece toothed insert 1200 to behave as a spring/suspension system to keep the spigot within the two-piece toothed insert 1200 and the two-piece toothed insert 1200 within the bell extension 1110, discussed in more detail below. The elastomeric material can be comprised of a variety of elastomeric materials, including, but not limited to, saturated rubbers, unsaturated rubbers, and the like. In an aspect, the bodies 1202 can comprise an elastomeric core that runs from the proximal end 1206 to the distal end 1204 of each body 1202.

As shown in FIGS. 10-11, each single body 1202 includes an outer surface 1220 and an inner surface 1230. The outer surface 1220 is configured to engage the interior surface 1112 of the bell extension 1110 and the inner surface 1230 is configured to engage the outer surface 1152 of the spigot 1150. When both bodies 1202 are inserted into the bell extension 1110, the inner surfaces 1230 combine to form an insert opening 1232 configured to receive the spigot 1150. In an aspect, the outer surfaces 1220 of the bodies 1202 include outer teeth 1224. In another aspect, the outer teeth 1224 are biased in the proximal direction, pointing toward the back end 1206 of the single body 1202. In an aspect, the inner surfaces 1230 of the bodies 1202 include inner teeth 1234. In another aspect, the inner teeth 1234 are biased in the distal direction, pointing towards the front end 1204 of the single body 1202. The outer and inner teeth 1224, 1234 are configured to engage respectively the interior surface 1112 of the bell extension 1110 and the outer surface 1152 of the spigot 1150, preventing the spigot 1150 from disengaging from the bell extension 1110.

In an aspect, the outer and inner teeth 1224, 1234 of both surfaces 1220, 1230 can be imbedded or otherwise contained in the elastomeric material of each deformable member/body 1202 of the retention device/two-piece toothed insert 1200. It is preferred that the outer and inner teeth 1224, 1234 are configured to be of a material that is capable of embedding within the interior surface 1112 of the bell extension 1110 and the outer surface of the spigot, respectively. Accordingly, the outer and inner teeth 1224, 1234 can be formed from a material that is harder than the body 1202 in order to increase the flexibility of the two-piece toothed insert 1200 while still providing outer and inner teeth 1224, 1234 capable of engaging the interior surface 1112 of the bell extension 1110 and the outer surface of the spigot 1152 respectively.

In an exemplary example, the teeth 1224, 1234 of both surfaces 1220, 1230 of both bodies 1202 are comprised of multiple rows of annular teeth 1224, 1234. In such an example, the teeth 1124, 1234 can be oriented in the opposite directions from one. In other embodiments, the teeth 1224, 1234 can be of any known types of teeth or prongs configured to engage another surface.

In an aspect, the outer surfaces 1220, outer teeth 1224, inner surfaces 1230, inner teeth 1234, and the elastomeric nature of the deformable members/single bodies 1202 work in combination to allow the spigot 1150 to enter into the opening 1232 and retain the spigot 1150 within the two-piece toothed insert 1200 once the spigot 1150 has been inserted completely. As the spigot 1150 is inserted further into the two-piece toothed insert 1200, the outer surface 1152 of the spigot 1150 pushes outwardly on the teeth 1234 of the inner surfaces 1230, compressing the elastomeric material of the bodies 1202. When the teeth 1234 are oriented towards the distal ends 1204 of the bodies of the two-piece toothed insert 1200, the teeth 1234 slide along the outer surface 1152 of the spigot 1150. Once the spigot 1150 is in a final position within the two-piece toothed insert 1200, the combination of the elastomeric material of the bodies 1202 pushing the inner surfaces 1230, including the teeth 1234, and the direction of the teeth 1234, which will embed into the outer surface 1152 of the spigot 1150, keep the spigot 1150 from exiting the two-piece toothed insert 1200. Further, the direction of the outer teeth 1224, and the force exerted by the outer surfaces 1220 of the bodies 1202 will embed the outer teeth 1224 into the interior surface 1112 of the bell extension 1110, keeping the two-piece toothed insert 1200 and the spigot 1150 within the bell extension 110.

In an aspect, the use of two single separate bodies 1202 provides flexibility for the two-piece toothed insert 1200. The two bodies 1202 are configured to move independently of each other, serving to enhance the gripping ability and increase redundancy so that if one body 1202 is not engaged completely and/or properly, the other body 1202 is not affected. Such an action can occur when the pipes 1100 and/or spigot 1150 are imperfect or through faulty installation. In addition, the separate bodies 1202 further increase the flexibility of the two-piece toothed insert 1200 to keep the spigot 1150 from damage on insertion. This non-restriction allows for each body 1202 to move inward further than if the two-piece toothed insert 1200 was one complete solid ring with no slots or slants as described above in relation to the deep channel insert 200.

FIGS. 12-16 illustrate a third embodiment of a pipe retention device 30 that utilizes a claw ring retainer 2200 to connect a pipe 2100 to a spigot 2150. The pipe 2100 can be comprised of similar materials as to the pipes 100, 1100 discussed above, and can include similar components. In an aspect, the pipe 2100 can include a bell 2102, an internal annular recess in an inner wall configured to contain a conventional gasket, a bell extension 2110, an interior surface 2112, and an exterior surface 2113. The bell extension 2110 can include a front (distal) end 2114, adjacent the seal formed by the gasket and spigot 2150, and a back (proximal) end 2116 opposite the distal end 2114. In an aspect, the interior surface 2112 and exterior surface 2113 are configured to be rigid anchor points for the claw ring retainer 2200, discussed in more detail below.

The claw ring retainer 2200, shown partially in FIGS. 12-16, includes a body 2202. While FIGS. 13 and 16 only show a portion of the claw ring retainer 2200 (i.e., in a half portion), the claw ring retainer 2200 is configured to form a deformable member/cylindrical body 2202. The cylindrical body 2202 can be formed from one single piece or a combination of pieces. The cylindrical body 2202 includes a distal (front) end 2204, a proximal (back) end 2206, and outer surface 2220, and an inner surface 2230. In an aspect, the outer surface 2220 of the claw ring retainer 2200 can include an outwardly opening annular recess 2222. The recess 2222 can be configured to receive a supplemental compression ring 2300. In an aspect, the supplemental compression ring 2300 can be configured to be adjustable, allowing for the manual tightening to ensure the claw ring retainer 2200 securely retains the bell extension 2110 and the spigot.

The inner surface 2230 forms an insert opening 2232 configured to receive the spigot 2150. The inner surface 2230 is configured to engage the outer surface 2152 of the spigot 2150, discussed in more detail below. The deformable member/cylindrical body 2202 of the claw ring retainer 2200 can have elastomeric properties, allowing for the body 2202 to be flexibly attached to the bell extension 2110 while retaining the spigot (not shown). In an exemplary aspect, the body 2202 of the claw ring retainer 2200 is almost completely made of a solid material, with a small portion of the body 202 being filled with an elastomeric portion to allow for flexibility.

The distal end 2204 of the claw ring 2200 includes an axially opening annular recess 2240 configured to receive the bell extension 2110. The axially opening annular recess 2240 includes an outer surface 2242 and an inner surface 2244. The outer surface 2242 and the inner surface 2244 of the axially opening annular recess 2240 are configured to engage the outer surface 2113 and inner surface 2112 respectively of the bell extension 2110. In an aspect, the width of the axially opening annular recess 2240 is large enough to receive the bell extension 2110 while having the inner and outer surfaces 2242, 2244 engaging the outer surface 2112 and inner surface 2113 of the bell extension 2110 respectively.

Figure 15:
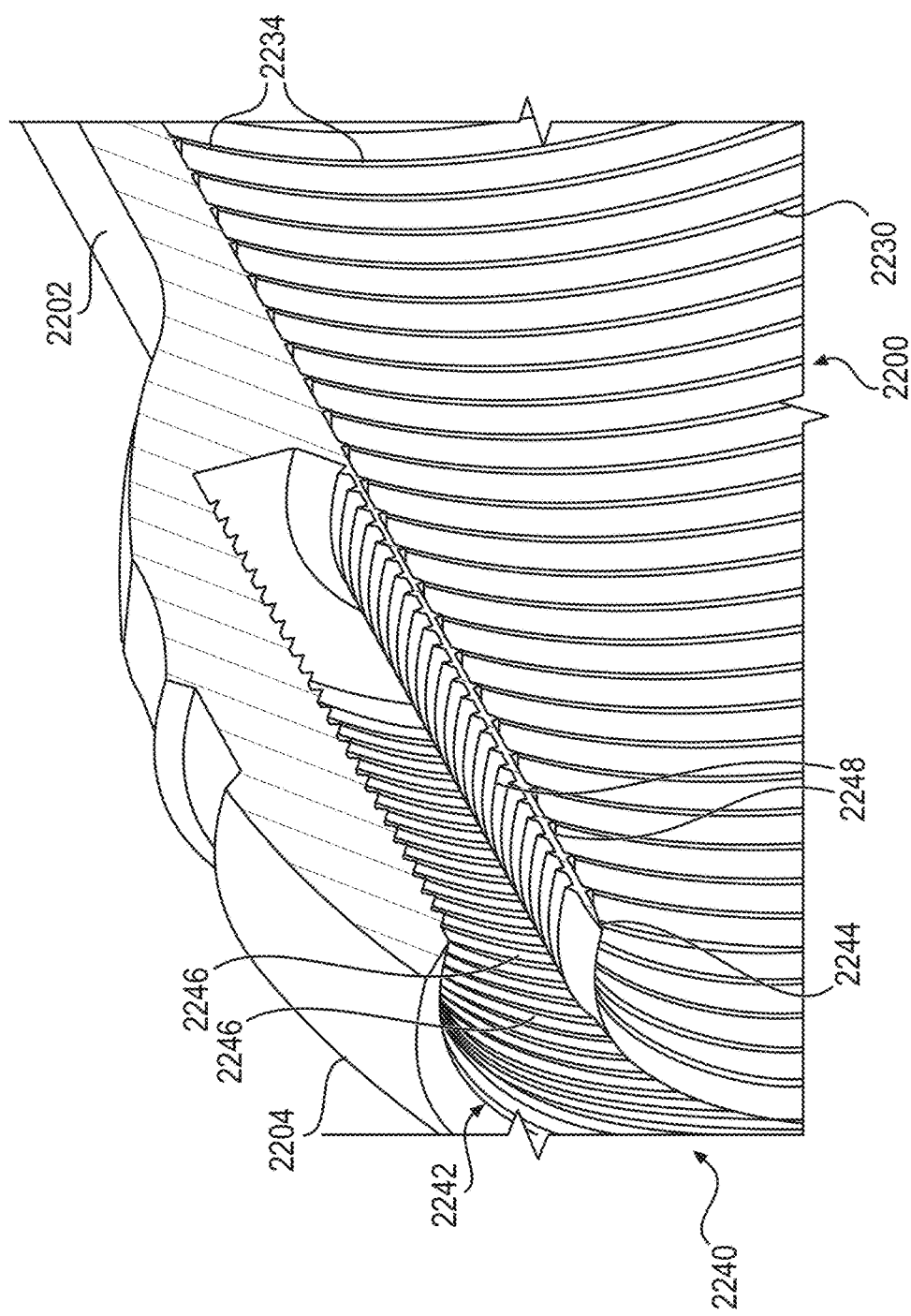
FIG. 15 is a sectional detail view of the retention device of FIG. 13.
Figure 18:
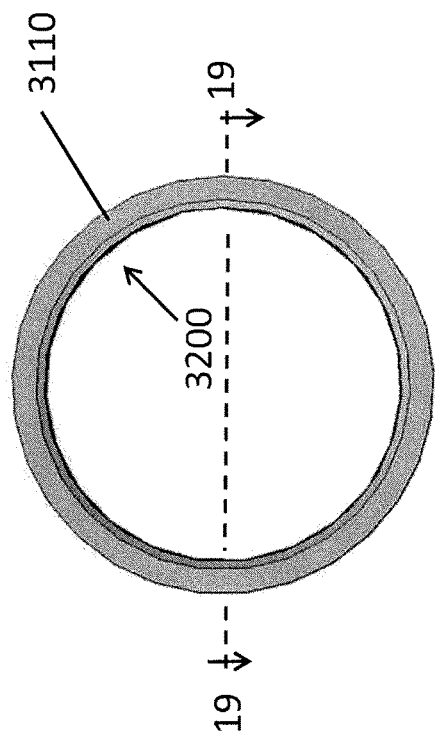
FIG. 18 is a front elevation view of the bell extension and retention device of FIG. 17.
Figure 16:
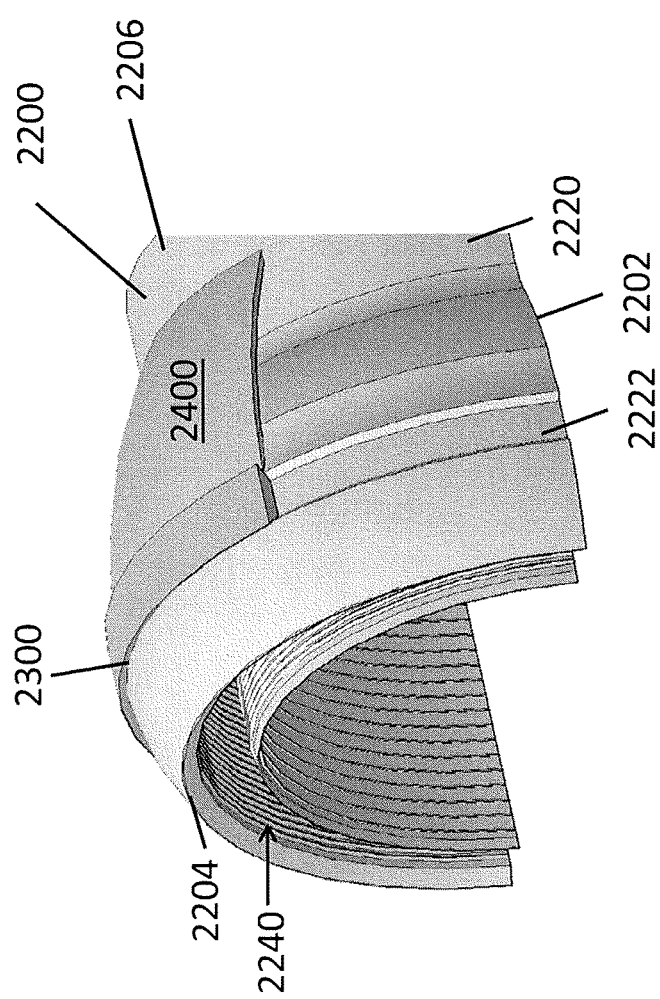
FIG. 16 is a sectional detail view of the retention device of FIG. 13.
Figure 17:
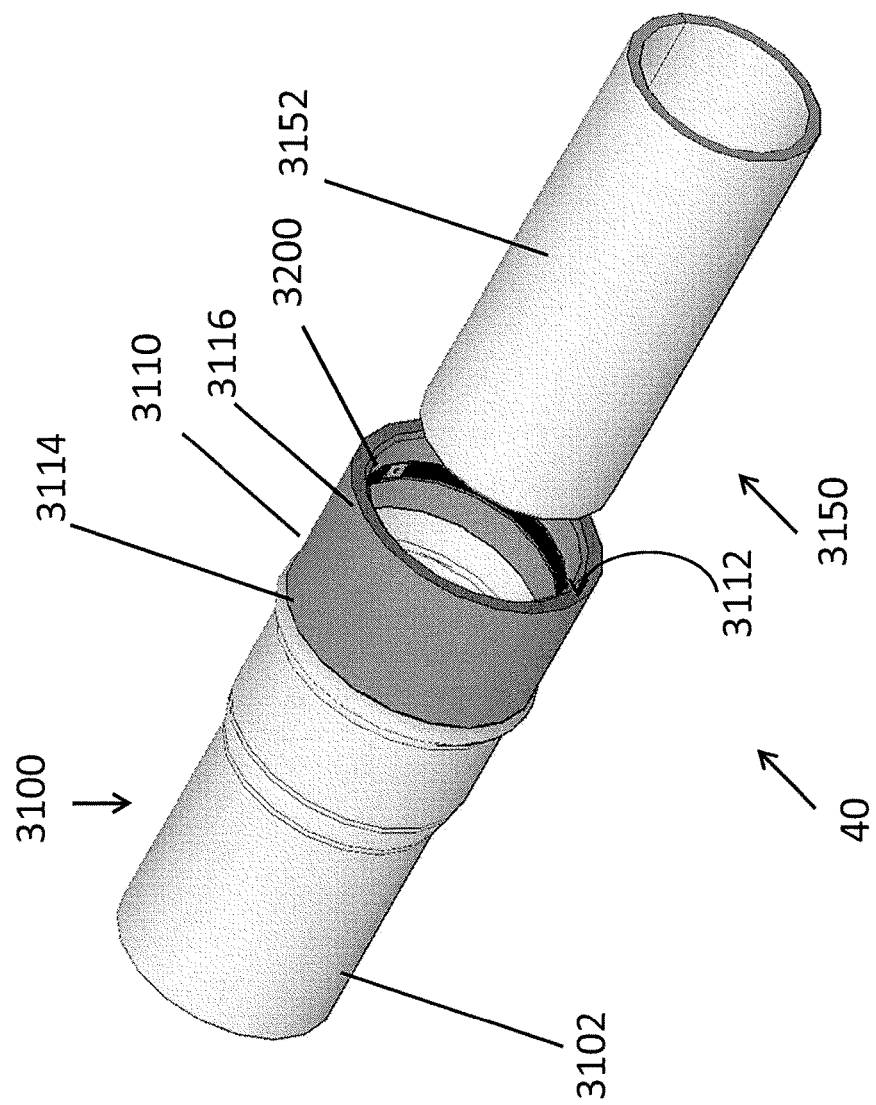
FIG. 17 is a perspective view of a bell extension, a spigot and a retention device according to an embodiment of the present invention.
Figure 19:
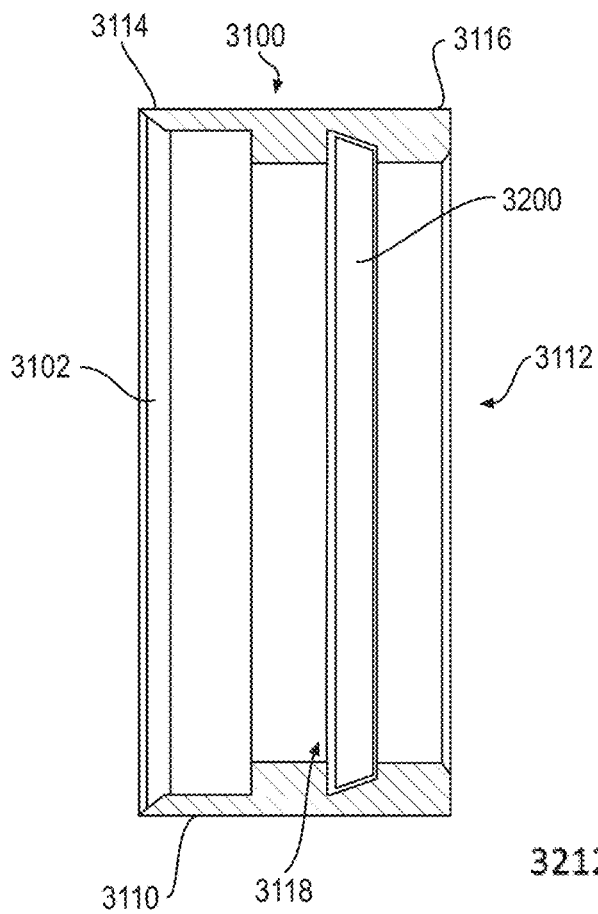
FIG. 19 is a cross-sectional view showing of the bell extension and retention device of FIG. 18 along line 19-19.
Figure 20:
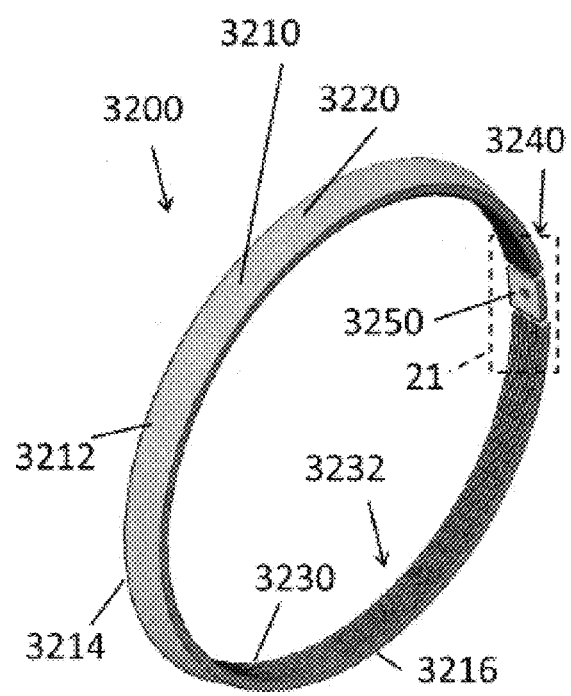
FIG. 20 is a perspective view of the retention device of FIG. 17.
Figure 21:
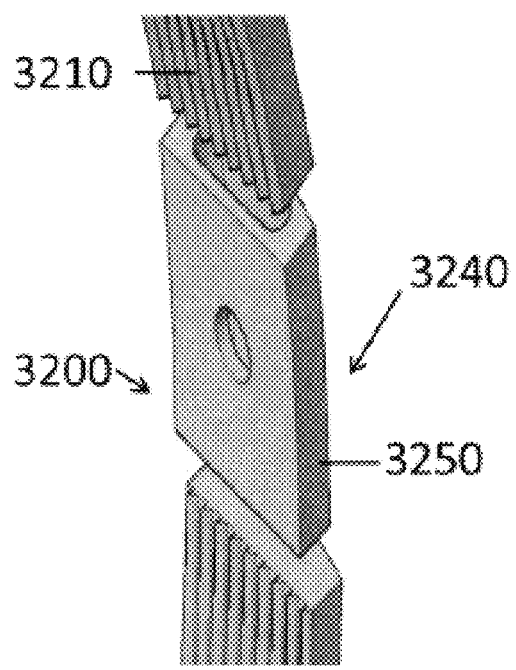
FIG. 21 is a detail view of the lock of the wedge lock ring of FIG. 20.
Figure 23:
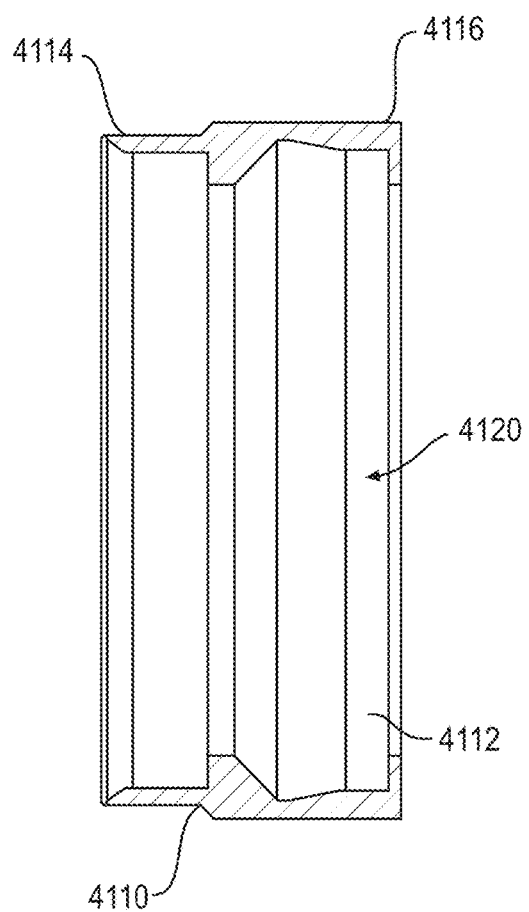
FIG. 23 is a cross-sectional view of the bell extension of FIG. 22 along line 23-23.
Figure 22:
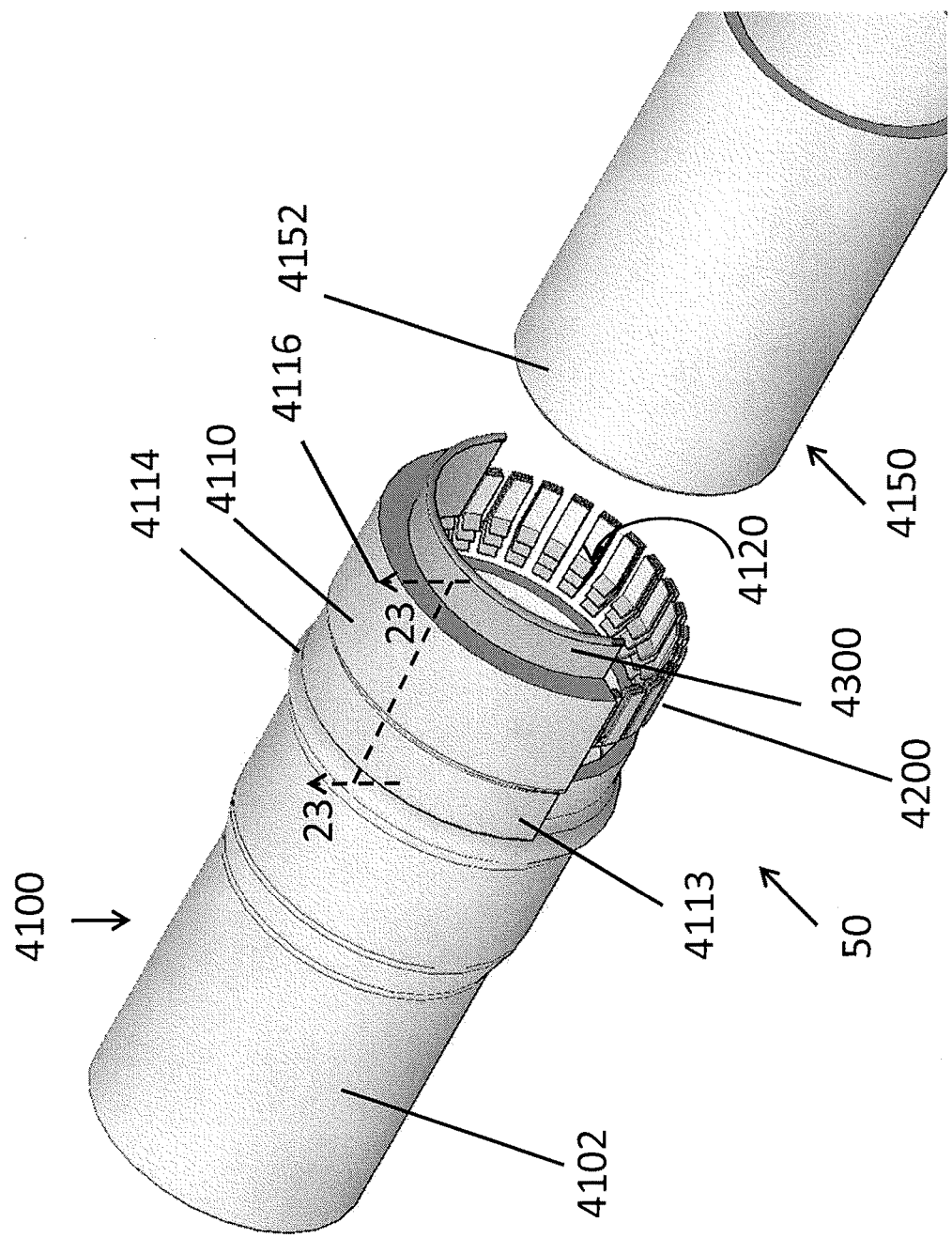
FIG. 22 is a perspective view of a bell extension, a spigot and a retention device according to an embodiment of the present invention.

Looking to FIG. 15, the outer surface 2242 and the inner surface 2244 of the axially opening annular recess 2440 include outer teeth 2246 and inner teeth 2248 respectively. Further, in another aspect, the inner surface 2230 of the claw ring retainer 2200 can include teeth 2234 to engage the surface 2152 of the spigot 2150. In an aspect, the inner surface teeth 2234 and the outer teeth 2246 and the inner teeth 2248 of the axially opening annular recess 2240 can be formed of a material that is configured to embed into the outer surface 2152 of the spigot 2150 and the outer surface 2112 and inner surface 2113 of the bell extension 2110 respectively. In a preferred embodiment, the teeth 2234, 2246, 2248 are configured to have some flexibility as to allow the spigot 2150 to be inserted into the insert opening 2230 and the bell extension 2110 to be inserted into the axially opening annular recess 2440 without damaging the teeth 2234, 2246, 2248.

The teeth 2234, 2246, 2248 are also oriented (e.g., angle of the teeth from the base surface to the point of the tooth) and configured to be of a length that allows the teeth 2234, 2246, 2248 to embed into the walls they respectively encounter (i.e., the outer surface 2152 of the spigot 2150 and the outer surface 2113 and inner surface 2112 respectively) at such a depth as to not shave but cut into the material. It is also preferably that the teeth 2234, 2246, 2248 have a thickness that prevents the teeth 2234, 2246, 2248 from breaking away from their respective surfaces 2230, 2242, and 2244. In an aspect, the teeth 2334, 2246, 2248 can be oriented to form crevices between each other to allow material of the engaged surfaces (i.e., the outer wall 2152 of the spigot 2150, the outer surface 2113 and inner surface 2112 of the bell extension respectively) to be retained/to accumulate within the crevices.

In an aspect, the inner and outer teeth 2246, 2248 of the axially opening annular recess 2240 are oriented to point towards the proximal end 2206 of the claw ring retainer 2200. The teeth 2234 of the inner surface 2330 are pointed in the distal direction. In an exemplary aspect, the inner teeth 2246 and the other teeth 2248 can be comprised of rings of substantially annular teeth. The number of rings of teeth 2234, 2246, 2248 can vary, but the number of rings of teeth 2334, 2246, 2248 cannot exceed a certain amount over a specified distance; if the proximity of teeth is to close (i.e., the crevices are not large enough to allow for volumetric displacement), the teeth 2334, 2246, 2248 will not engage the respective surfaces. In other aspects, the teeth 2234, 2246, 2248 can be comprised of various other embedding mechanisms.

In a further aspect, the claw ring retainer 2200 can be configured to utilize a supplemental compression ring 2300 and compression collar 2400. As discussed above, the supplemental compression ring 2300 can be configured to engage a channel 2222 on the exterior surface of the claw ring retainer 2200 to further tighten the claw ring retainer 2200. The compression collar 2400 can be configured to engage the outer surface 2220 of the claw ring retainer 2200. The compression collar 2400 can be a redundant mechanism that creates a flexible backbone for the claw ring retainer 2200 when the supplemental compression ring 2300 is already utilized. The compression collar 2400 presses in a direction that keeps the teeth 2248 of the outer surface 2244 of the recess 2240 engaged on the outer surface 2113 of the bell extension 2110. The compression collar 2400 can be placed on the claw ring retainer 2200 after the claw ring retainer 2300 has received the bell extension 2110 but before the insertion of the spigot.

To form the joint between the spigot and the bell extension 2110, the proximal end 2116 of the bell extension 2110 is inserted into the axially opening annular recess 2240. The inner surface 2112 and the outer surface 2113 engage the outer teeth 2246 and the inner teeth 2248 of the axially opening annular recess 2240 respectively. Since the bell extension 2110 is being inserted, the orientation of the teeth 2246, 2448 allow the surfaces 2113, 2112 respectively to press down on the teeth 2246, 2448 without the teeth embedding. Once the bell extension 2110 is in place (the proximal end 2116 meets the end of the axially opening annular recess 2240), a compression sleeve 2400 can be placed on the outside of the claw ring retainer 2200, pressing the outer teeth 2248 into the outer surface 2113 of the bell extension 2110 and partially securing the bell extension 2110 to the claw ring retainer 2200. Once secure, the spigot 2150 can be inserted. The spigot 2150 applies pressure to the inner surface 2230 of the claw ring retainer 2200, causing the inner teeth 2246 of the axially opening annular recess 2240 to engage/embed into the inner surface 2112 of the bell extension 2110. The teeth 2234 of the inner surface 2330 of the claw ring retainer 2200 will engage the outer surface 2152 of the spigot 2150 without embedding, sliding along the surface. Once the spigot has been fully inserted, the compression ring 2300 can be tightened, which can increase the depth of the teeth 2234, 2246, 2248 into the material of the spigot 2150 and bell extension 2110. Once the joint is formed between the pipe 2100, spigot 2150 and claw ring retainer 2200, removal of the spigot 2150 is not possible without destructive separation because of the engagement of the teeth 2234, 2246, 2248 with opposing surfaces 2152, 2112, 2113.

FIGS. 17-21 illustrate an embodiment of a removable pipe retention device 40 that utilizes a wedged lock ring assembly 3200 to connect a pipe 3100 to a spigot 3150. The pipe 3100 and spigot 3150 can be comprised of similar materials as to the pipes and spigots discussed above, and can include similar components. In an aspect, the pipe 3100 can include a bell 3102, an internal annular recess in an inner wall configured to contain a conventional gasket, a bell extension 3110, an interior surface 3112, and an exterior surface 3113. The bell extension 3110 has a length externally of the sealing of the conventional gasket to interact with the wedged lock ring assembly 3200. In an aspect, the length of the extension 3110 will be precisely enough for the wedged lock ring assembly 3200 to fit and function properly.

The bell extension 3110 can include a front (distal) end 3114, adjacent the seal formed by the gasket and spigot 3150, and a back (proximal) end 3116 opposite the distal end 3114. The interior surface 3112 of the bell extension 3110 includes an internal annular recess 3118. In an aspect, the internal annular recess 3118 (see FIG. 19) is configured to be an anchor point for the wedged lock ring assembly 3200, discussed in more detail below. In an aspect, the internal annular recess 3118 is configured to be slightly wider than that of the wedged lock ring assembly 3200, allowing the wedged lock ring assembly 3200 to move to allow the insertion of the spigot 3150 into the bell extension 3110, discussed in more detail below. In another aspect, the bell extension 3110 can further comprise a means to allow access to the wedged lock ring assembly 3200 from the exterior of the bell extension 3110. In such aspects, a locking aperture extending through the inner surface 3112 to the outer surface of the bell extension 3110 can be provided. In other aspects, a channel formed in the inner surface 3112 can extend through the proximal end 3116 of the bell extension to provide access.

In an aspect, the wedged lock ring assembly 3200 comprises a ring 3210 and a lock insert 3250. The ring 3210 comprises a deformable member in the form of a body 3212. The body 3212 can be configured to be slightly flexible to compress and fit easily into the bell extension 3110 by hand. In an aspect, the body 3212 of the ring 3210 can comprise an elastomeric material, similar to such elastomeric materials discussed above.

In an aspect, the ring 3210 includes a distal end 3214 and a proximal end 3216, wherein the distal end 3214 is configured to be aligned closer to the gasket of the bell 3102. In an aspect, the ring 3210 has a wedge cross-sectional shape, with the distal end 3214 having a larger width than the proximal end 3216. The ring 3210 includes an exterior surface 3220 and an interior surface 3230. In an aspect, the exterior surface 3220 is configured to engage the surface of the internal annular recess 3118 and the interior surface 3230 is configured to engage the exterior surface 3152 of the spigot 3150. In an aspect, the interior surface 3230 of the ring 3210 comprises teeth 3232. The teeth 3232 can be made of any material that can embed or cut into the outer surface 3152 of the spigot 3150. In an aspect, the teeth 3232 can be comprised of annular metal strips embedded into the body 3212 of the ring 3210.

In an aspect, the teeth 3232 are configured to be long enough to fully engage the exterior surface 3152 of the spigot 3150, meaning the teeth 3232 will embed in the outer surface 3152 of the spigot 3150 at such a depth as to not 'shave' the material but cut into it. In an aspect, the teeth 3232 of the ring 3210 comprise annular rings of teeth 3232. In such an aspect, the rows of teeth 3232 are in an amount to appropriately engage the amount of spigot 3150 needed to prevent separation. The number of rows of teeth 3232 cannot exceed a certain amount over a specified distance; if the proximity of the teeth 3232 is to close there will be a non-engagement of the material of the spigot 3150. Space is needed between each row of teeth 3232 to allow for the affected portion of material of the spigot 3150 to move out of the way and be replaced by the teeth 3232 (i.e. volumetric displacement). The angle of the teeth 3232 from the inner surface 3230 to the point of the tooth 3232 is be large enough to allow material (i.e., the outer surface 3152 of the spigot 3150) to retain/accumulate in the crevice while also maintaining a proper orientation as to prevent separation. The teeth 3232 should also be thick enough so as not to break away from the interior surface 3230. In another aspect, the teeth 3232 can be oriented in the distal direction (i.e., the direction of the insertion of the spigot). The orientation of the teeth 3232 allow the spigot 3150 to be inserted into the ring 3210 without damaging the teeth 3232 and/or the spigot 3150 without preventing insertion of the spigot 3150. However, if the ring 3210 is constricted (discussed below), an opposite force on the spigot 3150 (i.e., pulling the spigot out or pressure from fluid flowing from the pipe 3100 to the spigot) will cause the teeth 3232 to dig into the surface 3152 of the spigot 3150.

In an aspect, the ring 3210 of the wedged lock ring assembly 3200 is not a complete ring, having a gap 3240 configured to interact with a lock insert 3250. When the wedged lock ring assembly 3200 is inserted into the bell extension 3110, and more specifically the recession 3118, the lock insert 3250 is configured to fit into the gap 3240. The insert lock 3250 is configured to expand the ring 3210 to allow the spigot 3150 to be inserted and removed. As the spigot 3150 travels further into the bell extension 3110 while the insert lock 3250 expands the ring 3210, the spigot 3150 engages the ring 3210, but pushes the ring 3210 further into the annular recess 3118. In an aspect, the wedge shape of the ring 3210 further assists in the ease of insertion of the spigot 3150 (since it is smaller at the proximal end 3206, less resistance is met by the spigot 3150).

The insert lock 3250 is configured to restrict the ring 3210 to retain the spigot within the bell extension 3110. When the insert lock 3250 is placed in a closed position, the insert lock 3250 pulls the edges of the ring 3210 closer, contracting the ring 3210, and further embedding the teeth 3232 into the surface of the spigot. The wedge shape of the ring 3210 assists in the retention of the fully inserted spigot 3150 (the distal end 3204 has a larger width, applying more pressure). As stated above, when the insert lock 3250 is placed in an open position, the insert lock 3250 will push the edges of the ring 3210 found in the gap to expand the ring 3210, preventing the ring 3210, and the teeth 3232, from engaging the surface of the spigot. By placing the insert lock 3250 in an open position, a once secured spigot can be removed.

In an aspect, keeping the ring 3210 tight around the spigot 3150, but not necessarily engaged, prevents slippage of the ring 3210 in the case of unexpected vibrations or other factors that may cause the ring 3210 to retract into the annular recess 3118. In other words, the ring 3210 needs to be tight to prevent the disengagement of the pipe 3100 and spigot 3150 when the joint formed flexes. If the insert lock 3250 was not there, and wasn't tightened upon such a flex, the wedged lock ring assembly 3200 could loosen enough (through vibration) to separate the joint formed.

In an aspect, the insert lock 3250 can be configured to function in a rotational manner, rotating from an open position to a closed position. In another aspect, the insert lock 3250 can be configured to operate in a sliding fashion. In an aspect, the insert lock 3250 can include clasps, prongs or appendages that engage the ends of the ring 3210 found in the gap 3240. In other aspects, other retaining means can be employed by the insert lock 3250.

FIGS. 22-26 illustrate an embodiment of a removable pipe retention device 50 that utilizes an annularly aligned teeth assembly 4200 to connect a pipe 4100 and a spigot 4150. The pipe 4100 and spigot 4150 can be comprised of similar materials as to the pipes and spigots discussed above, and can include similar components. In an aspect, the pipe 4100 can include a bell 4102, an internal annular recess in an inner wall configured to contain a conventional gasket, a bell extension 4110, an interior surface 4112, and an exterior surface 4113. The bell extension 4110 has a length externally of the sealing of the conventional gasket to interact with the aligned teeth assembly 4200. In an aspect, the length of the extension will be precisely enough for the aligned teeth assembly 4200 to fit and function properly.

The bell extension 4210 includes a distal end 4114 adjacent the seal formed by the gasket and spigot 4150 and a proximal end 4116 opposite the distal end 4114. In addition, as illustrated in FIGS. 22-24 and 26, the bell extension 4110 includes an annular seat 4120 to house the retention device/aligned teeth assembly 4200. In an aspect, the annular seat 4120 is wider towards the distal end 4114 than at the proximal end 4116 of the bell extension 4110, discussed in more detail below. In an aspect, the extension 4110 is of a length and a thickness to house the aligned teeth assembly 4200.

As shown in FIGS. 22 and 24-26, the retention device 50 includes an aligned teeth assembly 4200. The aligned teeth assembly 4200 comprises a plurality of individual teeth 4210. In an aspect, the teeth 4210 are configured to be rigid enough to maintain contact with the outer surface 4152 of an inserted spigot 4150 while retaining enough elasticity to move out of the way when the spigot 4150 is being inserted to prevent damage to the spigot 4150. The teeth 4210 need to be harder and stronger than the pipe material, or strong enough to engage or be embedded in the pipe material. The teeth 2410 of the assembly 4200 can be connected by a casing (not shown) that fits within the seat 2120. In another aspect, the teeth assembly 4210 can be attached directly to the surface of the seat 2120 through various fastening means known in the art.

The teeth 4210 include a distal end 4212 and a proximal end 4214. The teeth 4210 include a main body portion 4216 and a flange portion 4218, with the flange portion 4218 oriented at an obtuse angle from the main body portion 4216 facing a singular figurative axis down the center of the tube extension 4110. In other aspects, the flange portion 4218 can be curved. The flange portion 4218 is oriented at the distal end of the tooth 4210, and the main body portion 4216 at the proximal end 4214.

In an aspect, the proximal end 4214 of each tooth 4210 can be coupled to a casing or coupled to the annular seat 4120. While various means of coupling can secure the proximal end 4214 of each tooth 4210, such means should allow the distal end 4212 to move in a restricted manner to engage the surface 4152 of the spigot 4150 and the interior of the bell extension 4110, and namely the annular seat 4120.

Figure 24:
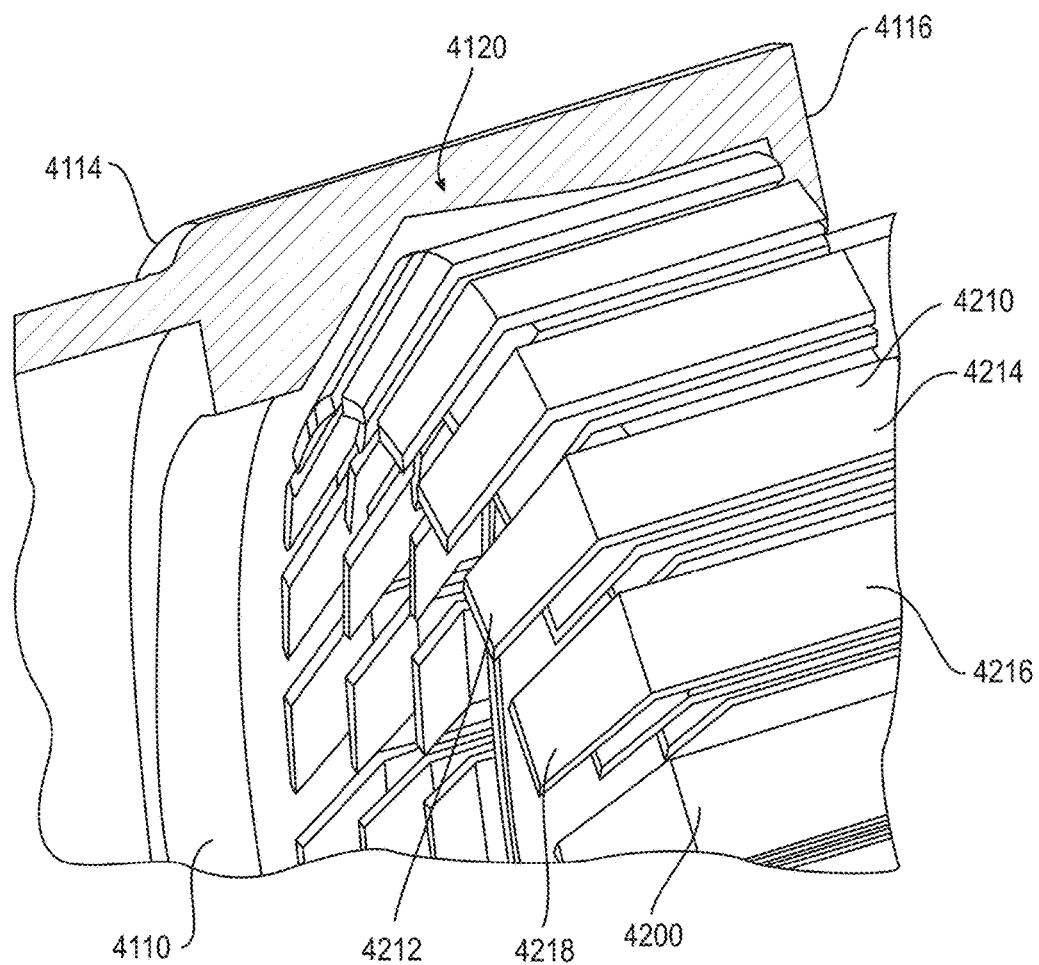
FIG. 24 is a perspective sectional cutaway view of the bell extension and retention device of FIG. 22.
Figure 25:
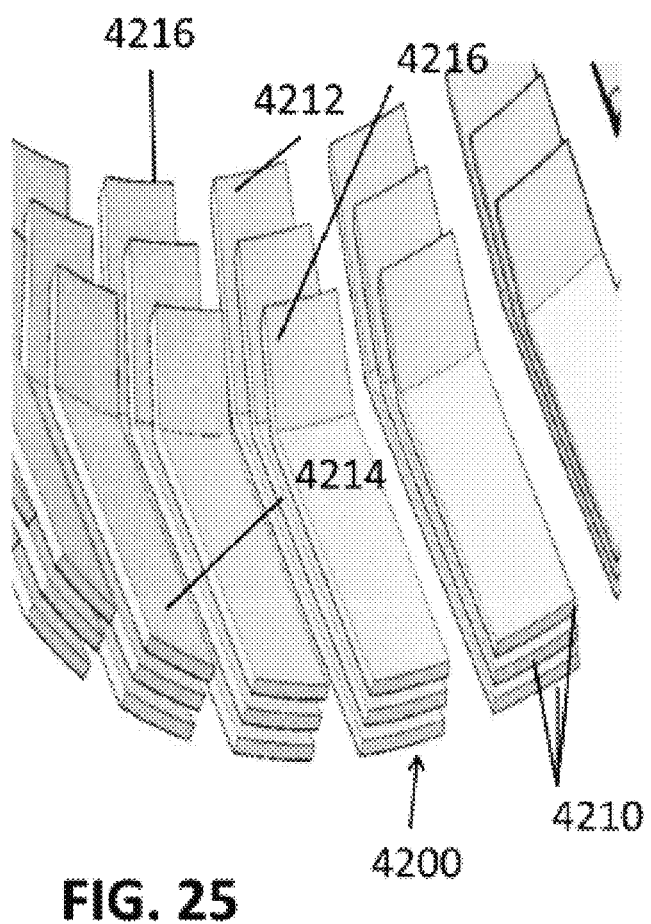
FIG. 25 is a sectional view of the retention device of FIG. 22.
Figure 26:
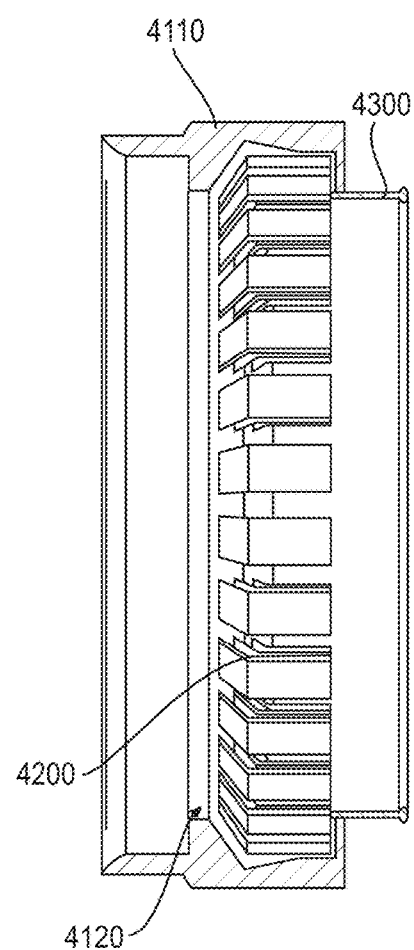
FIG. 26 is a partial cutaway view of the bell extension, the release device, and retention device of FIG. 22.

In an aspect, each tooth 4210 is mated with at least one other tooth 4210 such that the flange portions 4218 are nested with one another, as shown in FIGS. 24-26. In an exemplary aspect, the teeth 4210 are nested by three, with the teeth 4210 having various lengths. Other numbers of combinations of teeth 4210 can be used in other aspects. While stacked or nested, each tooth 4210 is capable of individual movement, contributing to the prevention of a separation of a spigot 4150 that is not perfectly round or that might be damaged in some way.

In an aspect, when the spigot 4150 is inserted into the aligned teeth assembly 4200 (housed in the annular seat 4120), the teeth 4210 will move back into the wider area of the seat 4120 (located towards the distal end 4114). When attempting to retract the spigot 4150, the teeth 4210 will engage the surface 4152 of the spigot 4150 due to the angle and original conformation of the aligned teeth assembly 4200, with the teeth 4210 forcing themselves to contract around the spigot 4150 towards a singular axis in the middle.

The stacking of the multiple independent teeth 4210 on one another provides a measure of redundancy that ensures a substantial force is applied to the surface 4152 of the spigot 4150 when the spigot 4150 is inserted. The redundant factor improves and ensures proper performance of the retention device/aligned teeth assembly 4200 even if there was a problem during installation of an individual tooth 4210 breaks. No further mechanism must be tightened or placed in for the locking mechanism to activate.

In an aspect, a release device 4300 can be used to disengage the aligned teeth assembly 4200 for the removal of the spigot 4150, as illustrated in FIG. 26. The release device 4300 has a slightly larger diameter than the outside 4152 of the spigot 4150, but has a diameter smaller than the interior of the bell extension 4110. When the release device 4300 is inserted into the bell extension 4110 between the spigot 4150 and the aligned teeth assembly 4200, the release device 4300 engages the teeth 4210, forcing the teeth 4210 to move back into the annular seat 4120 of the bell extension 4110, thus disengaging the teeth 4210 from the surface of the spigot and allowing the spigot's removal without substantial effort.

Figure 27:
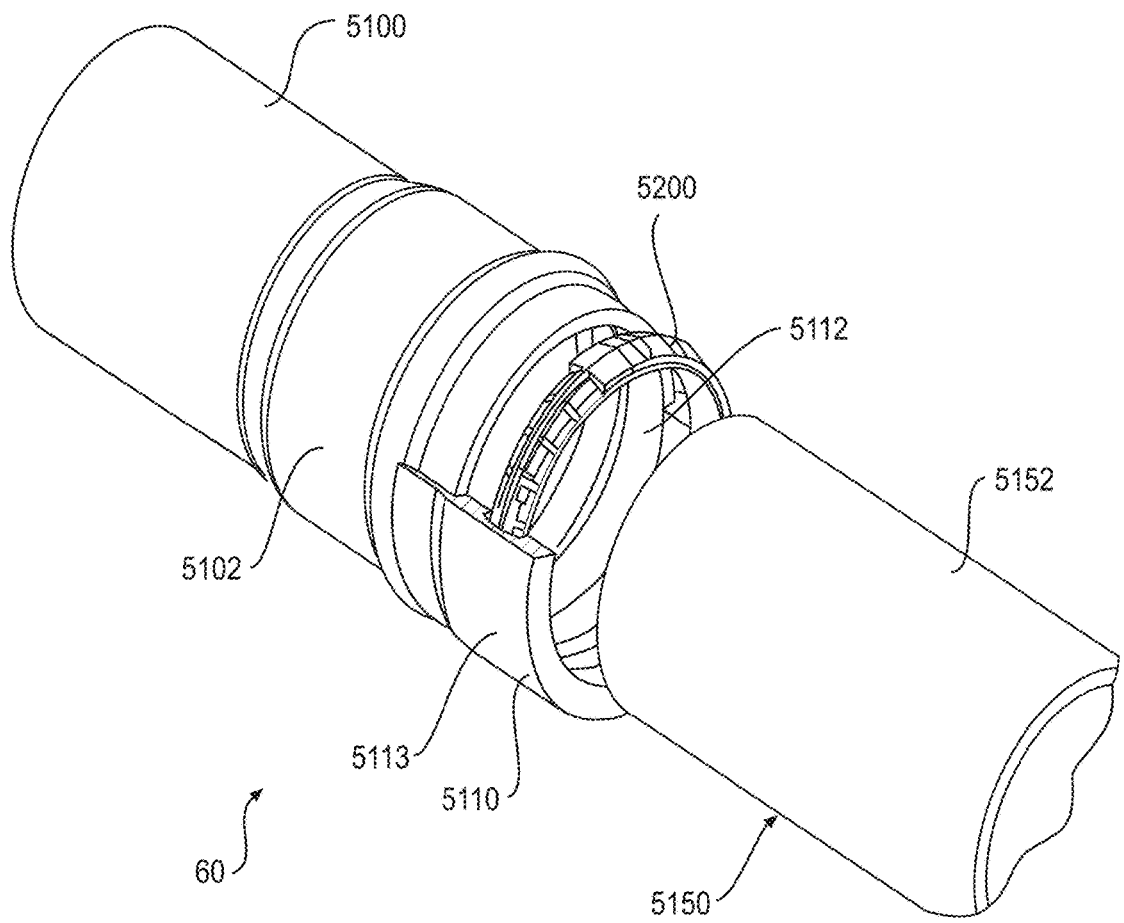
FIG. 27 is a perspective view of a bell extension, a spigot and a retention device according to an embodiment of the present invention.
Figure 28:
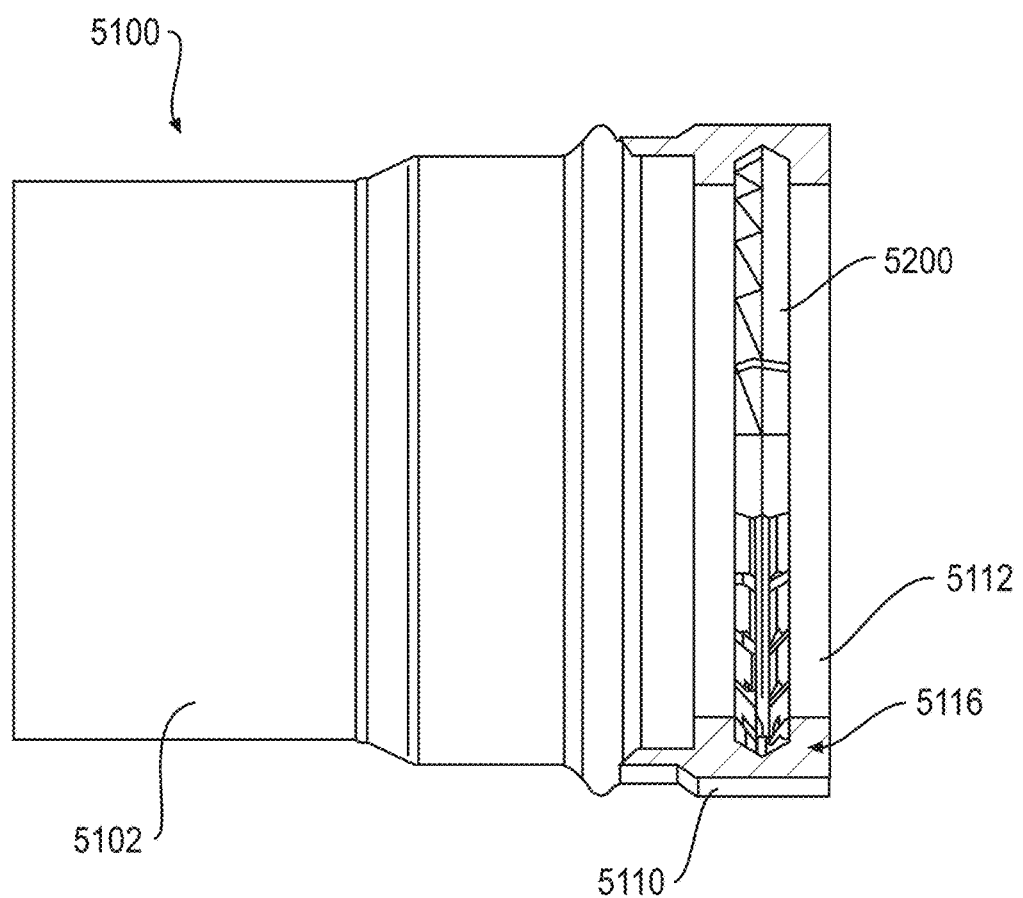
FIG. 28 is a partial cutaway view of the bell extension and retention device of FIG. 27.
Figure 29:
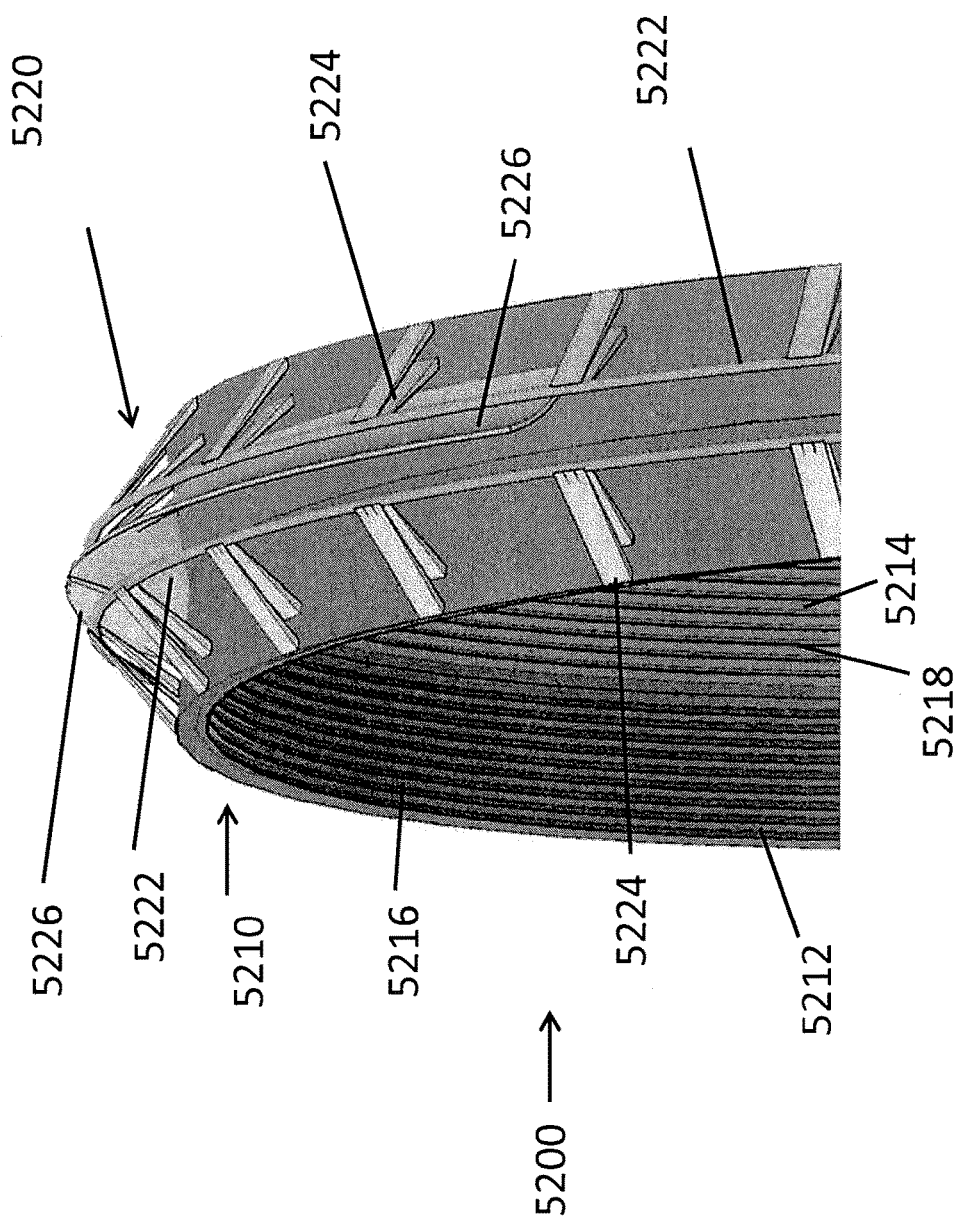
FIG. 29 is a partial perspective view of the retention device of FIG. 27.

FIGS. 27-31 illustrate an embodiment of a removable pipe retention device 60 that utilizes a constrictor insert 5200 to connect a pipe 5100 and a spigot 5150. The constrictor insert 5200 can be used to prevent over-insertion or construct an internal joint restraint. The pipe 5100 and spigot 5150 can be comprised of similar materials as to the pipes and spigots discussed above, and can include similar components. In an aspect, the pipe 5100 can include a bell 5102, an internal annular recess in an inner wall configured to contain a conventional gasket, a bell extension 5110, an interior surface 5112, and an exterior surface 5113. The bell extension 5110 has a length externally of the sealing of the conventional gasket to interact with the constrictor insert 5200. In an aspect, the bell extension 5110 can also be thickened in order to avoid affecting the standards of the remainder of the pipe 5100. In an aspect, the length of the extension will be precisely enough for the constrictor insert 5200 to fit and function properly. Although FIGS. 27-28 illustrate the bell extension 5110 in a partial sectional view, the bell extension 5110 is configured to form a complete cylindrical body.

As illustrated in FIG. 28, the bell extension 5110 further comprises an annular channel 5116. In an aspect, the annular channel 5116 is configured to retain the constrictor insert 5200. The annular channel 5116 can be routed or formed to correspond to the shape of the constrictor insert 5200, but slightly larger. As illustrated in FIGS. 27-31, the constrictor insert 5200 comprises a double wedge or pentagonal shape, with the shape of the annular channel 5116 corresponding. In an aspect, the bell extension 5110 can provide access to the constrictor insert 5200 when retained in the annular channel 5116, discussed in detail below.

FIGS. 27-30 illustrate the constrictor insert 5200. In an aspect, the constrictor insert 5200 can comprise a gap (not shown) that allows for the radial compression of the constrictor insert 5200 in order to assist in the insertion within the annular channel 5116. According to an aspect, the constrictor insert 5200 comprises an inner band 5210 and an outer band 5220. The inner band 5210 includes two mirrored plates 5212, 5214. In an aspect, the mirrored plates 5212, 5214 are configured to angularly rotate freely within the inner band 5210. In an aspect, the outer surfaces (not visible) slidably engage with the inner surfaces of the outer bands 5220.

The inner surfaces of the mirrored plates 5212, 5214 are configured to engage the outer surface 5152 of the spigot 5150 upon insertion. In an aspect, the mirrored plates 5212, 5214 comprise teeth 5216, 5218 respectively. The orientation and configuration of the teeth 5216, 5218 are configured to prevent over insertion on one side (5212) and to retain the spigot 5150 upon insertion (5214). It is possible for both sets of teeth 5126, 5128, neither, or one to be engaged at any time.

In an aspect, the teeth 5218 on the proximal plate 5214 are oriented in a proximal direction to prevent the spigot 5150 from being inserted too far into the constrictor insert 5200. In the same aspect, the teeth 5216 on the distal plate 5212 are oriented in the distal direction to retain the spigot 5150 upon insertion.

In an aspect, the teeth 5216, 5218 are long enough to fully engage the outer surface 5152 of the spigot 5150, meaning the teeth 5216, 5218 will embed in the pipe wall/outer surface 5152 at such a depth as to not 'shave' the material but cut into it. The angle of the teeth 5216, 5218 from the base surfaces of the respective mirror plates 5212, 5214 to the point of the teeth 5216, 5218 is large enough to allow material of the spigot 5150 that is displaced to retain/ accumulate in the crevice while also maintaining a proper orientation as to prevent separation. The teeth 5216, 5218 should also be thick enough so as not to break away from the base surface. The number of aligned rows of teeth 5216, 5218 and the separation distance between each row are calculated to engage the appropriate amount of pipe material. The number of teeth 5216, 5218 cannot exceed a certain amount over a specified distance; if the proximity of teeth is to close there will be a non-engagement of the material. Space is needed between each row to allow for the affected portion of material to move out of the way and be replaced by the insert's teeth 5216, 5218. (i.e. volumetric displacement).

In an aspect, adjustable bands 5222 of the outer band 5220 are used to retract/expand the mirrored plates 5212, 5214 into a desired position. The bands 5222 will be rigid enough to maintain a maximum expanded diameter when not adjusted and elastic enough so that they may be tightened by an access point on the bell extension 5110. When the bands 5222 are tightened the diameter will decrease therefore engaging either/both the restraint and over-insertion functions provided by the teeth 5216, 5218.

Support stays 5224 are arrayed around the constrictor insert 5200 between the adjustable bands 5222 and the mirrored pieces 5212, 5214. The support stays 5224, being rigid connections, further assist in the retraction/extraction of the mirrored plates 5212, 5214 and their respective alignment. In an aspect, the support stays 5224 are rigid connections to prevent bending with the adjustable bands 5222 are tightened. The stays 5224 are part of a redundant system that will maintain the proper alignment and conformation of the constrictor insert 5200 in the corresponding states of function. The rigidity of the stays 5224 is important for keeping the device 5200 engaged properly. In an aspect, arcs 5226 can support the adjustable bands 5222. The arcs 5226 are structurally supportive of the configuration that enables both functions of retention and insertion limitation provided by the separate plates 5212, 5214 and their respective teeth 5216, 5218.

Figure 30:
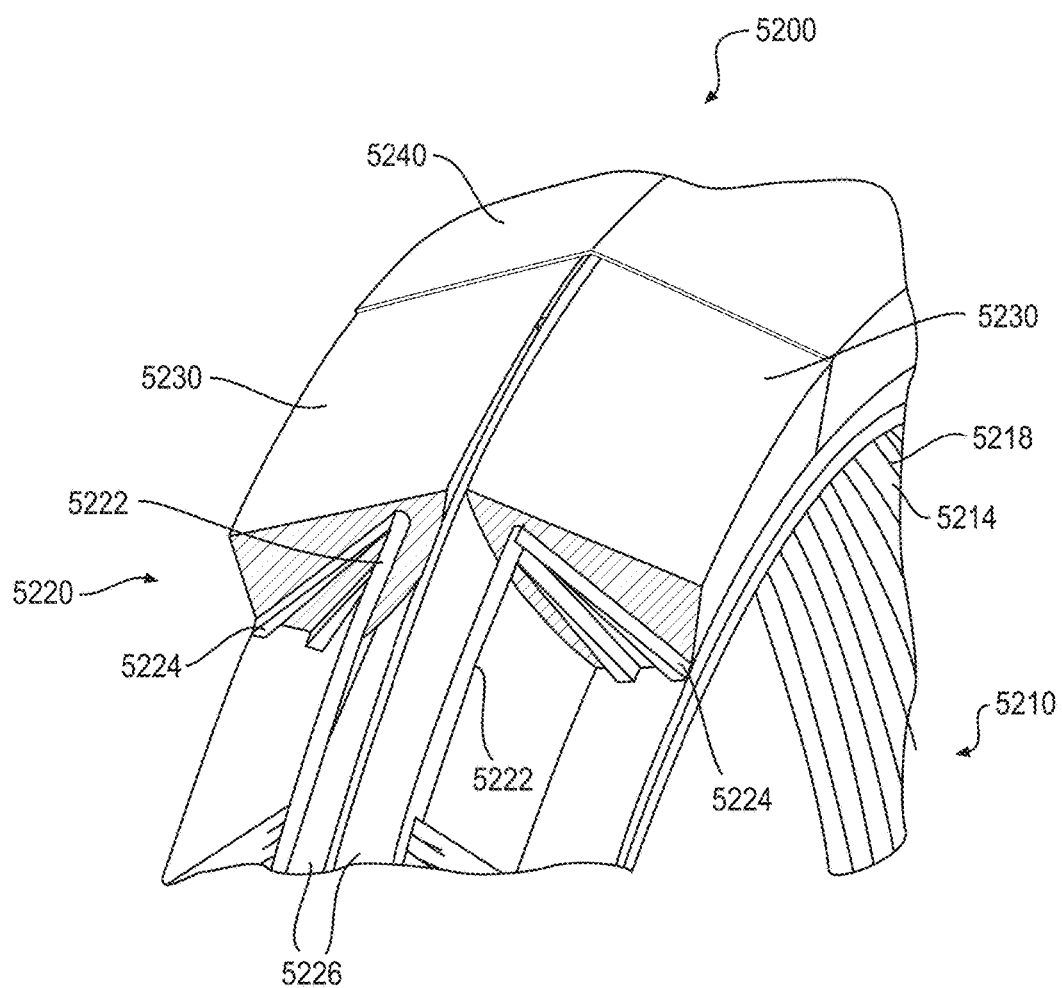
FIG. 30 is a sectional view of the retention device of FIG. 27.

In an aspect, the outer bands 5222 of the constrictor insert 5200 further comprise a supporting elastomeric body 5230, shown in FIG. 30. The elastomeric body 5230 further assists in the retraction and expansion of the mirrored plates 5212, 5214 by holding the retractive and expansive forces aforementioned. In an aspect, the outer bands 5222, including the stays 5224, arcs 5226, and elastomeric body 5230, can be enclosed in a shell 5240. The housing 5240 can also prevent the constrictor insert 5200 from expanding or contracting in the wrong way. The shell 5240 can provide access from outside of the bell extension 5110 to allow for the adjustment of the adjustable bands 5222 and other relevant parts. In an aspect, the collapsible gap will most likely be where the adjustments to the bands will take place. In an aspect, the bands 5222 can be expanded to allow the spigot 5150 to be removed.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A retention device for joining lengths of pipe, the retention device comprising:
    a deformable member, wherein each pipe length comprises a spigot end and a bell end elongated to form a bell extension configured to receive the retention device, wherein the deformable member further comprises:
        a flexible body comprising:
            an inner surface forming an insert opening for the spigot end, the inner surface configured to engage the exterior surface of the spigot end;
            an outer surface configured to engage an interior surface of the bell extension;
            a base ring oriented at a proximal end, and
            a slot that runs the length of the flexible body from a distal end to the proximal end and through the base ring; and
        a plurality of teeth comprising:
            a first portion of the plurality of teeth oriented on the outer surface of the flexible body, the first portion configured to engage the interior surface of the bell extension; and
            a second portion of the plurality of teeth oriented on the inner surface of the flexible body, the second portion configured to engage the exterior surface of the spigot end,
            wherein the deformable member is configured to engage at least the bell extension or spigot end for resiliently urging the plurality of teeth into engagement.

2. The retention device of claim 1, wherein the deformable member has a length that is approximately equal to the length of the bell extension.

3. The retention device of claim 1, wherein the flexible body further comprises a distal end and a proximal end, wherein the first portion of the plurality of teeth are biased in the direction of the proximal end and the second portion of the plurality of teeth are biased in the distal direction.

4. The retention device of claim 3, wherein the plurality of teeth comprise multiple rows of annular teeth.

5. The retention device of claim 1, wherein the flexible body further comprises an elastomeric core.

6. The retention device of claim 5, wherein the elastomeric core is wider at a distal end than at a proximal end of the flexible body.

7. A retention device for joining lengths of pipe, the retention device comprising:
    a deformable member, wherein each pipe length comprises a spigot end and a bell end elongated to form a bell extension configured to receive the retention device, wherein the deformable member further comprises:
        a flexible body comprising:
            an inner surface forming an insert opening for the spigot end and configured to the exterior of the spigot end;
            an outer surface configured to engage the interior surface of the bell extension;
            a base ring oriented at a proximal end, and
            a plurality of flexible sections configured to allow for individual movement of the flexible sections, wherein the plurality of flexible sections are formed by a plurality of slits, the plurality of slits running the length of the flexible body from a distal end to the proximal end but terminating before reaching the base ring; and
        a plurality of teeth comprising:
            a first portion of the plurality of teeth oriented on the exterior surface of the flexible body, the first portion of the plurality of teeth configured to engage the interior surface of the bell extension; and a second portion of the plurality of teeth oriented on the interior surface of the flexible body, the second portion of the plurality of teeth configured to engage the exterior surface of the spigot end, wherein the deformable member is configured to engage at least the bell extension or spigot end for resiliently urging the plurality of teeth into engagement.

8. A pipe joining system for joining lengths of pipe comprising:
 a. a plurality of pipe lengths, wherein each length pipe comprises:
  i. a spigot end; and
  ii. a bell end, wherein the bell end is elongated to form a bell extension;
 b. a plurality of retention devices configured to be inserted into the bell extension, the retention devices comprising:
  i. a deformable member comprising:
   A. an outer surface;
   B. an inner surface, wherein the inner surface forms an insert opening to receive the spigot end;
   C. a distal end;
   D. a proximal end;
   E. a base ring oriented at the proximal end; and
   F. a plurality of slits that run from the distal end to the proximal end and terminate at the base ring configured to allow the flexible body to be deformed when inserted; and
  ii. a plurality of teeth configured to retain the spigot end within the deformable member and the deformable member within the bell extension, the plurality of teeth comprising:
   A. a first portion of the plurality of teeth found on the outer surface of the flexible body, the first portion of the plurality of teeth oriented in a proximal direction and configured to engage an interior surface of the bell extension; and
   B. a second portion of the plurality of teeth found on the inner surface of the flexible body oriented in a distal direction and configured to engage an exterior surface of the spigot end of the pipe length.

* * * * *